(12) United States Patent
Brand et al.

(10) Patent No.: US 8,013,047 B2
(45) Date of Patent: Sep. 6, 2011

(54) OLIGO- AND POLY-CARBONATES TERMINATED WITH SILICON CONTAINING GROUPS AS SURFACE MODIFIERS

(75) Inventors: Fabien Jean Brand, Huningue (FR); Archana Kishore Desai, Maharashtra (IN); Michèle Gerster, Binningen (CH); Shrirang Bhikaji Hindalekar, Maharashtra (IN); Suhas Dattatraya Sahasrabudhe, Maharashtra (IN); Paragkumar Nathalal Thanki, Maharashtra (IN); Michael Tinkl, Eiken (CH); Andrea Preuss, Basel (CH); Jürgen Wiethan, Emmendingen (DE); Kishor Prabhakar Kumbhar, Maharashtra (IN)

(73) Assignee: BASF SE Ludwigshafen (DE)

( * ) Notice: Subject to any disclaimer, the term of this patent is extended or adjusted under 35 U.S.C. 154(b) by 377 days.

(21) Appl. No.: 11/921,808

(22) PCT Filed: Jun. 7, 2006

(86) PCT No.: PCT/EP2006/062954
§ 371 (c)(1),
(2), (4) Date: May 15, 2009

(87) PCT Pub. No.: WO2006/134045
PCT Pub. Date: Dec. 21, 2006

(65) Prior Publication Data
US 2010/0010135 A1    Jan. 14, 2010

(30) Foreign Application Priority Data

Jun. 13, 2005  (IN) .............................. 720/CHE/2005
Feb. 2, 2006  (EP) ..................................... 06101184

(51) Int. Cl.
C08K 5/04       (2006.01)
C07F 7/02       (2006.01)
C07F 7/08       (2006.01)

(52) U.S. Cl. ......... 524/383; 524/384; 556/400; 556/401
(58) Field of Classification Search ................... 556/400, 556/401

See application file for complete search history.

(56) References Cited

U.S. PATENT DOCUMENTS

| | | | | |
|---|---|---|---|---|
| 3,026,298 A | | 3/1962 | Lee et al. | 260/47 |
| 3,189,662 A | * | 6/1965 | Vaughn, Jr. | 528/33 |
| 4,148,773 A | | 4/1979 | Mark et al. | 260/29.1 |
| 4,474,932 A | | 10/1984 | Bier et al. | 528/25 |
| 4,663,374 A | | 5/1987 | Sonoda | 524/118 |
| 5,112,925 A | | 5/1992 | Horlacher et al. | 525/474 |
| 5,227,449 A | | 7/1993 | Odell et al. | 525/26 |
| 5,366,805 A | * | 11/1994 | Fujiki et al. | 428/412 |
| 5,608,026 A | * | 3/1997 | Hoover et al. | 528/26 |
| 5,783,651 A | | 7/1998 | König et al. | 528/21 |
| 6,054,254 A | | 4/2000 | Sato et al. | 430/322 |
| 6,875,807 B2 | * | 4/2005 | Durairaj et al. | 524/502 |

FOREIGN PATENT DOCUMENTS

| | | |
|---|---|---|
| EP | 0479107 | 4/1992 |
| EP | 0595141 | 5/1994 |
| EP | 0879843 | 11/1998 |
| JP | 07258398 A * | 10/1995 |
| WO | 01/74946 | 10/2001 |
| WO | 03/057767 | 7/2003 |

\* cited by examiner

*Primary Examiner* — Robert Loewe
(74) *Attorney, Agent, or Firm* — Tyler A. Stevenson

(57) ABSTRACT

The instant invention relates to oligo- and poly-carbonates terminated with silicon containing groups which are useful as reducers of surface energy for organic materials such as polycarbonates, polyesters or polyketones or their mixtures, blends or alloys. Polymers with such reduced surface energy possess self-cleaning, anti-soiling, anti-graffiti, oil resistance, solvent resistance, chemical resistance, self-lubricating, scratch resistance, low moisture absorption, dirt pickup resistance, slip properties and a hydrophobic surface; and display anti-adhesion properties against proteins and against microorganisms such as for example, bacteria, fungi and algae.

15 Claims, No Drawings

OLIGO- AND POLY-CARBONATES TERMINATED WITH SILICON CONTAINING GROUPS AS SURFACE MODIFIERS

The present invention relates to novel oligo- and polycarbonates terminated with silicon containing groups, to compositions comprising an organic material, preferably a synthetic polymer such as a polycarbonate, polyester, polyacrylate or polymethyacrylate or their mixtures, blends or alloys, and to the novel surface modifiers, as well as the use of the novel compounds as reducer of surface energy of organic materials. Polymers with such a reduced surface energy possess an "easy to clean", "self-cleaning" "antisoiling" "soil-release", "antigraffiti", "oil resistance", "solvent resistance", "chemical resistance", "self lubricating", "scratch resistance", "low moisture absorption" "dirt pickup resistance", "slip properties" and "hydrophobic surface"; and antiadhesion properties against proteins and against microorganism such as for example bacteria, fungi and algae.

For articles prepared from thermoplastic polymers in certain areas, there is a definite need for easy self-cleaning properties for thermoplastic glazing, particularly polycarbonate clear sheets and films used in glazing applications. Self-cleaning may occur by rain water running over the surface of a sheet. Easy self-cleaning is important in order to maintain high light transmission properties of transparent or translucent sheet and to minimize build up of unwanted materials on the surface of the sheet. This would also dramatically lower the frequency of cleaning roofing or glazing in buildings, covered walkways, conservatories, automotive and transportation applications, and the like. This would also be advantageous for decorative translucent thermoplastic sheet such as opal white or bronze thermoplastic sheet.

WO-A-03/057767 discloses polycarbonate sheets having on the outer surface a coating composition having a hydroxy-functional silicone modified acrylate polymer additive in sufficient amount. This allows ease of removing solid particles (dirt) and/or liquids on the surface by reducing the adhesion of such particles and/or liquids to the substrate. The contact angle of a water droplet on the commercially available polycarbonate sheet is about 66° and on the treated sheet about 101°.

WO-A-01/74946 discloses dendrimer additives incorporated in thermoplastic resins (such as polycarbonate resins) are effective to alter the surface characteristics of the thermoplastic resin. Such compositions can be injection molded to produce articles in which the dendrimer additive is concentrated at the surface of the article to alter the properties of the resin. By selection of the type of dendrimer additive, the resulting characteristics of the molded article may be controlled.

It has now been found that new oligo- and poly-carbonates terminated with silicon containing groups are useful for various technical applications such as reducers of surface energy for organic materials, preferably polycarbonates, polyesters, polyacrylates or polymethyacrylates or their mixtures, blends or alloys. Polymers with such a reduced surface energy possess an "easy to clean", "self-cleaning" "antisoiling", "soil-release", "antigraffiti", "oil resistance", "solvent resistance", "chemical resistance", "self lubricating", "scratch resistance", "low moisture absorption" "dirt pickup resistance", "slip properties" and "hydrophobic surface"; and antiadhesion properties against proteins and against microorganism such as for example bacteria, fungi and algae.

It has also been found that the new oligo- and poly-carbonates terminated with silicon containing groups are useful as melt additive for polymers without affecting the ancillary properties of the polymer and without release of a biocidal additive.

The present invention therefore provides a compound of the formula I

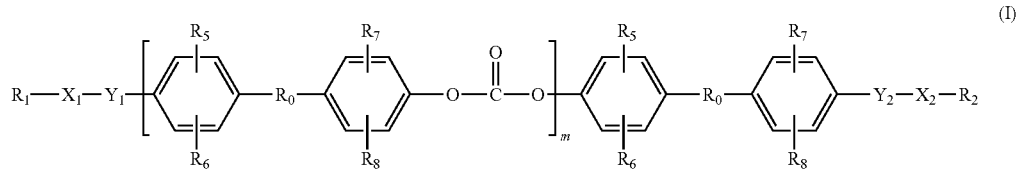

wherein $R_0$ is a direct bond,

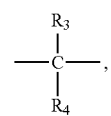

$-O-$, $-S-$, $-SO-$, $-SO_2-$ or

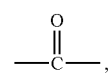

$R_1$ and $R_2$ are each independently of the other a silicon containing group, $R_3$ and $R_4$ are each independently of the other hydrogen, a fluorine containing group, a silicon containing group, $C_1$-$C_{12}$alkyl, phenyl or

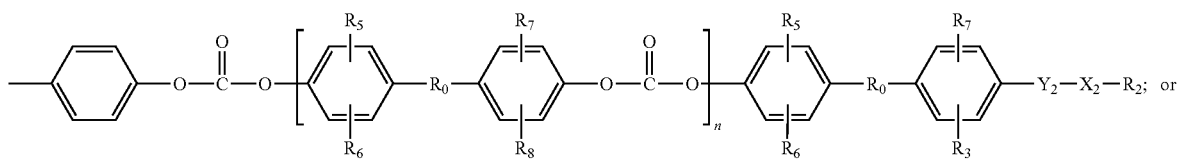

$R_3$ and $R_4$, together with the carbon atom to which they are bonded, form a $C_5$-$C_8$-cycloalkylidene ring that is unsubstituted or substituted by from 1 to 3 $C_1$-$C_4$alkyl groups;

$R_5$, $R_6$, $R_7$ and $R_8$ are each independently of the other hydrogen, $C_1$-$C_{12}$alkyl or $C_3$-$C_{12}$alkenyl, $X_1$ and $X_2$ are each independently of the other a direct bond or $C_1$-$C_{12}$alkylene or $C_4$-$C_{25}$alkylene interrupted with oxygen;

$Y_1$ and $Y_2$ are each independently of the other a direct bond, oxygen,

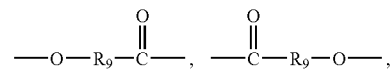

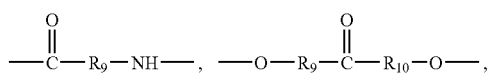

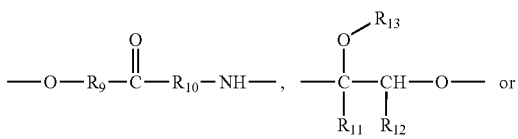

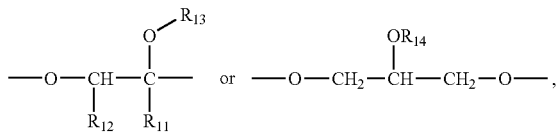

$R_9$ and $R_{10}$ are each independently of the other a direct bond or $C_1$-$C_4$alkylene, $R_{11}$, $R_{12}$ and $R_{13}$ are each independently of the other hydrogen, $C_1$-$C_{12}$alkyl or $C_3$-$C_{12}$alkenyl, $R_{14}$ is hydrogen, $C_1$-$C_{12}$alkyl or a silicon containing group, m is 0 to 10,000, and n is 0 to 10,000.

A silicon containing group is preferably a radical of the formula II

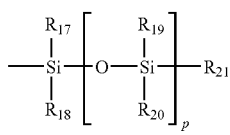

(II)

wherein $R_{17}$, $R_{18}$, $R_{19}$ and $R_{20}$ are each independently of the other $C_1$-$C_{12}$alkyl, $C_1$-$C_{12}$alkyl substituted with hydroxy or amino; $C_4$-$C_{12}$hydroxyalkyl interrupted with oxygen; or

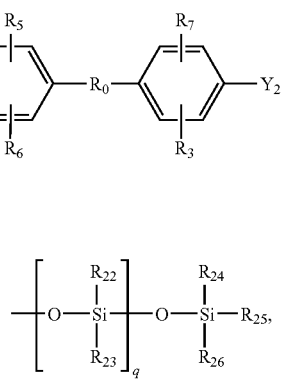

$R_{21}$ is $C_1$-$C_{12}$alkyl or

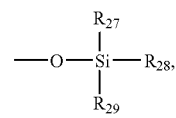

$R_{22}$, $R_{23}$, $R_{24}$, $R_{25}$, $R_{26}$, $R_{27}$, $R_{28}$ and $R_{29}$ are each independently of the other $C_1$-$C_{12}$alkyl or $C_1$-$C_{12}$-alkyl substituted with hydroxy or amino;

p is 0 to 200, and q is 0 to 200.

Of special interest as a silicon containing group is a radical of the formula II, wherein $R_{17}$, $R_{18}$, $R_{19}$ and $R_{20}$ are each independently of the other methyl or

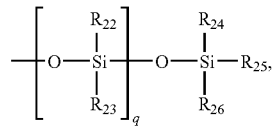

$R_{21}$ is methyl or

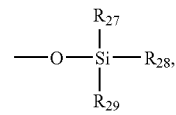

$R_{22}$, $R_{23}$, $R_{24}$, $R_{25}$, $R_{26}$, $R_{27}$, $R_{28}$ and $R_{29}$ are methyl, and p and q are each independently of the other 0 to 100.

Alkyl having up to 12 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl or dodecyl. One of the preferred definitions for $R_3$ and $R_4$ is, for example, $C_1$-$C_8$alkyl, for example $C_1$-$C_4$alkyl, such as methyl.

A $C_5$-$C_8$cycloalkylidene ring substituted by $C_1$-$C_4$alkyl, which contains preferably from 1 to 3, especially 1 or 2, branched or unbranched alkyl group radicals, is, for example, cyclopentylidene, methylcyclopentylidene, dimethylcyclopentylidene, cyclohexylidene, methylcyclohexylidene, dimethylcyclohexylidene, trimethylcyclohexylidene, tert-butylcyclohexylidene, cyclo-heptylidene or cyclooctylidene. Preference is given to cyclohexylidene.

$C_1$-$C_{12}$Alkylene is a branched or unbranched radical, for example methylene, ethylene, propylene, trimethylene, tetramethylene, pentamethylene, hexamethylene, heptamethylene, octamethylene, decamethylene or dodecamethylene. One of the preferred definitions for $X_1$ and $X_2$ is $C_1$-$C_8$alkylene, for example $C_2$-$C_8$alkylene. An especially preferred definition for $X_1$ and $X_2$ is $C_2$-$C_4$alkylene, for example ethylene.

$C_4$-$C_{25}$Alkylene interrupted with oxygen is a branched or unbranched radical, for example —$CH_2CH_2$—O—$CH_2CH_2$—, —$CH_2CH_2CH_2$—O—$CH_2CH_2$—, —$CH_2CH_2CH_2$—O—$CH_2CH_2CH_2$— or —$CH_2CH_2$—O—$CH_2CH_2$—O—$CH_2CH_2$—.

Alkenyl having 3 to 14 carbon atoms is a branched or unbranched radical such as, for example, propenyl, 2-butenyl, 3-butenyl, isobutenyl, n-2,4-pentadienyl, 3-methyl-2-butenyl, n-2-octenyl, n-2-dodecenyl or iso-dodecenyl.

$C_4$-$C_{12}$hydroxyalkyl interrupted with oxygen is for example —$CH_2CH_2$—O—$CH_2CH_2OH$ or —$CH_2CH_2$—O—$CH_2CH_2$—O—$CH_2CH_2OH$.

A fluorine containing group is a branched or unbranched radical, which contains at least one fluoro atom, for example $C_1$-$C_{25}$-fluoroalkyl; or —$(CF_2)_sF$, wherein s is 1 to 50.

$C_1$-$C_{25}$-Fluoroalkyl is for example perfluoroalkyl, fluoromethyl, 2-fluoroethyl, 3-fluoropropyl, 4-fluorobutyl, 5-fluoropentyl, 6-fluorohexyl, 7-fluoroheptyl, difluoromethyl, trifluoromethyl, penta-fluoroethyl, pentafluorobutyl.

Of interest are compounds of the formula I, wherein $R_0$ is

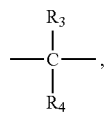

$R_1$ and $R_2$ are each independently of the other a silicon containing group, $R_3$ and $R_4$ are each independently of the other hydrogen, trifluoromethyl, a silicon containing group, $C_1$-$C_{12}$alkyl, phenyl or $R_3$ and $R_4$, together with the carbon atom to which they are bonded, form a $C_5$-$C_8$-cycloalkylidene ring that is unsubstituted or substituted by from 1 to 3 $C_1$-$C_4$alkyl groups;

$R_5$, $R_6$, $R_7$ and $R_8$ are hydrogen, $X_1$ and $X_2$ are each independently of the other $C_1$-$C_{12}$alkylene or $C_4$-$C_{25}$alkylene interrupted with oxygen;

$Y_1$ and $Y_2$ are each independently of the other a direct bond, oxygen,

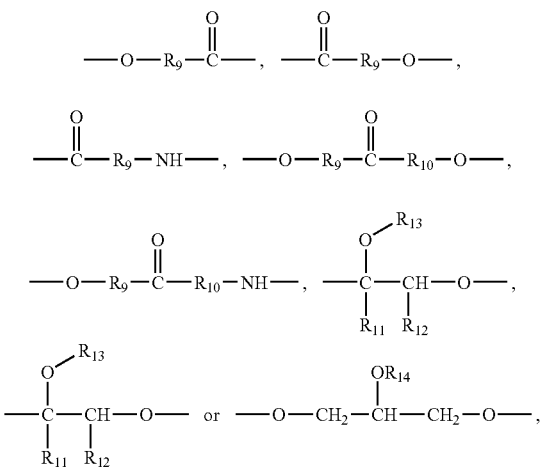

$R_9$ and $R_{10}$ are each independently of the other a direct bond or methylene, $R_{11}$, $R_{12}$ and $R_{13}$ are each independently of the other hydrogen, $C_1$-$C_4$alkyl or $C_3$-$C_4$alkenyl, $R_{14}$ is hydrogen or $C_1$-$C_{12}$alkyl, m is 0 to 10,000, and n is 0 to 10,000.

Of very special interest are compounds of the formula I, wherein $R_0$ is

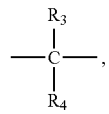

$R_3$ is hydrogen, $CF_3$, $C_1$-$C_{12}$alkyl, phenyl or

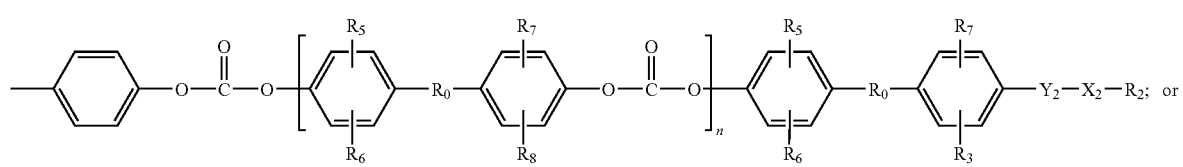

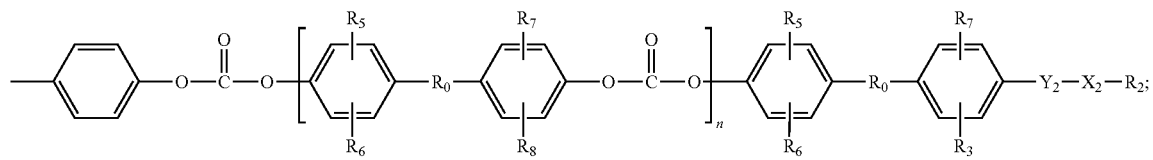

$R_4$ is hydrogen, $CF_3$, $C_1$-$C_{12}$alkyl or phenyl; or $R_3$ and $R_4$, together with the carbon atom to which they are bonded, form a $C_5$-$C_8$-cycloalkylidene ring that is unsubstituted or substituted by from 1 to 3 $C_1$-$C_4$alkyl groups;

$R_5$, $R_6$, $R_7$ and $R_8$ are hydrogen, $X_1$ and $X_2$ are each independently of the other $C_1$-$C_{12}$alkylene or $C_4$-$C_{25}$alkylene interrupted with oxygen;

$Y_1$ and $Y_2$ are each independently of the other a direct bond, oxygen,

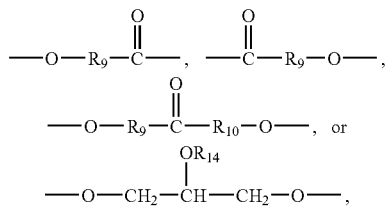

$R_9$ and $R_{10}$ are each independently of the other a direct bond or methylene, $R_{14}$ is hydrogen or $C_1$-$C_{12}$alkyl, m is 0 to 10,000, and n is 0 to 10,000.

Of interest are also compounds of the formula I, wherein $R_3$ and $R_4$ are each independently of the other hydrogen or $C_1$-$C_4$alkyl; or $R_3$ and $R_4$, together with the carbon atom to which they are bonded, form a cyclohexylidene ring.

Preferred are compounds of the formula I, wherein $X_1$ and $X_2$ are each independently of the other $C_2$-$C_8$alkylene or $C_4$-$C_{25}$alkylene interrupted with oxygen.

Also preferred are compounds of the formula I, wherein m is 0 to 100, and n is 0 to 100.

Of very special interest are compounds of the formula I, wherein $R_0$ is

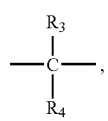, $R_3$ and $R_4$ are each independently of the other $C_1$-$C_4$alkyl; or $R_3$ and $R_4$, together with the carbon atom to which they are bonded, form a cyclohexylidene ring;

$R_5$, $R_6$, $R_7$ and $R_8$ are hydrogen, $X_1$ and $X_2$ are each independently of the other $C_2$-$C_4$alkylene or $C_4$-$C_{25}$alkylene interrupted with oxygen;

$Y_1$ and $Y_2$ are each independently of the other a direct bond, oxygen,

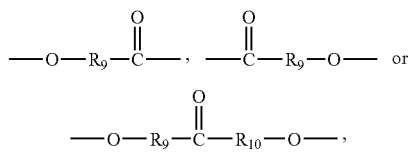

$R_9$ and $R_{10}$ are each independently of the other a direct bond or methylene, m is 0 to 100, and n is 0 to 100.

The compounds of the formula I can be prepared in per se known manner. In a typical reaction procedure, a silicon alcohol is treated with bis(2,4-dinitrophenyl)carbonate (DNPC) to give in situ 2,4-dinitrophenyl carbonate of the silicon alcohol. This derivative can easily be isolated and treated separately by for example hydroxy terminated bisphenol A oligomers of various molecular weights. However, for simplicity, the process is preferably carried out in one pot. Brunelle et al., Macromolecules 1991, 24, 3035-3044, discloses the use of bis(2,4-dinitrophenyl)carbonate for preparation of dimer and cyclic oligomers of bisphenol A. The coupling reactions can also be carried out by carbonate linkage forming reagents such as for example phosgene or carbonyl diimidazole (CDI).

Especially preferred silicon containing groups are derived from mono hydroxy polysiloxanes of the formula A (p=10) or B (p=64) or polyalkyleneoxide modified heptamethyltrisiloxane of the formula C or 3-(polyoxyethylene) propylheptamethyltrisiloxane of the formula D.

(A)
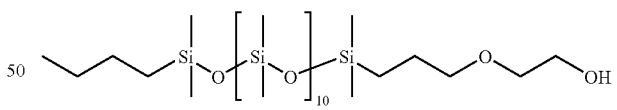

(B)
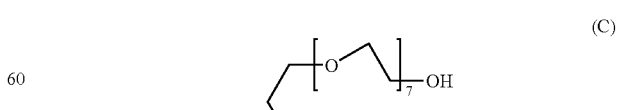

(C)
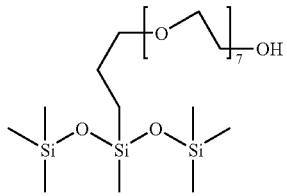

-continued

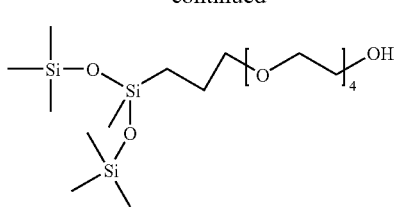
(D)

Preferred bisphenol starting materials are for example bisphenol A and the compounds of the formula 1, 2 and 3.

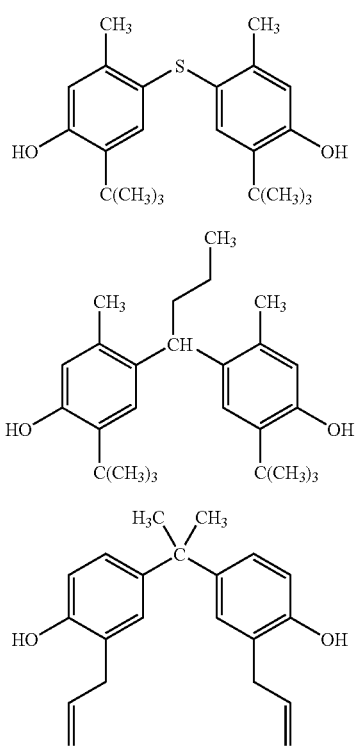

The compounds of the formula are suitable as reducers of surface energy for organic materials. Polymers with such a reduced surface energy possess an "easy to clean", "self-cleaning" "antisoiling", "soil-release", "antigraffiti", "oil resistance", "solvent resistance", "chemical resistance", "self lubricating", "scratch resistance", "low moisture absorption", "dirt pickup resistance", "slip properties" and "hydrophobic surface"; and antiadhesion properties against proteins and against microorganism such as for example bacteria, fungi and algae.

Illustrative examples of such materials are:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
  a) radical polymerisation (normally under high pressure and at elevated temperature.
  b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).
2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).
3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.
4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).
6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.
6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.
6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).
6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.
8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.
9. Polymers derived from α,β-unsaturated acids and derivatives thereof such as polyacrylates and polymethacrylates; polymethyl methacrylates, polyacrylamides and polyacrylonitriles, impact-modified with butyl acrylate.
10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.
11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.
12. Homopolymers and copolymers of cyclic ethers such as polyalkylene glycols, polyethylene oxide, polypropylene oxide or copolymers thereof with bisglycidyl ethers.
13. Polyacetals such as polyoxymethylene and those polyoxymethylenes which contain ethylene oxide as a comonomer; polyacetals modified with thermoplastic polyurethanes, acrylates or MBS.
14. Polyphenylene oxides and sulfides, and mixtures of polyphenylene oxides with styrene polymers or polyamides.
15. Polyurethanes derived from hydroxyl-terminated polyethers, polyesters or polybutadienes on the one hand and aliphatic or aromatic polyisocyanates on the other, as well as precursors thereof.
16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
17. Polyureas, polyimides, polyamide-imides, polyetherimids, polyesterimids, polyhydantoins and polybenzimidazoles.
18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.
19. Polycarbonates and polyester carbonates.
20. Polysulfones, polyether sulfones and polyether ketones.
21. Crosslinked polymers derived from aldehydes on the one hand and phenols, ureas and melamines on the other hand, such as phenol/formaldehyde resins, urea/formaldehyde resins and melamine/formaldehyde resins.
22. Drying and non-drying alkyd resins.
23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends and alloys of the aforementioned polymers (polyblends), for example PP/EPDM, Polyamide/EPDM or ABS, PVC/EVA, PVC/ABS, PVC/MBS, PC/ABS, PC/Polyester, PBTP/-ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

30. Aqueous emulsions of natural or synthetic rubber, e.g. natural latex or latices of carboxylated styrene/butadiene copolymers.

The new compounds of the formula I can also be mixed or blended with one or more additives useful in polymer industry. The present invention relates therefore also to a mixture comprising (α) a compound of the formula I, and (β) one or more additives selected from the group consisting of phenolic antioxidants, light-stabilizers, processing stabilizers, nucleating agent, biocides, antistatic agents, flame retardants and fillers.

Of special interest are mixtures wherein the weight ratio of the components (α):(β) is from 100:0.01 to 0.01 to 100.

Further objects of the invention are therefore compositions comprising a) an organic material which is susceptible to oxidative, thermal or light-induced degradation, and b) at least one compound of the formula I.

Preferred organic materials are natural, semi-synthetic or, preferably, synthetic polymers.

Particularly referred organic materials are synthetic polymers, most preferably thermoplastic polymers. Especially preferred organic materials are polycarbonates, polyesters, polyacrylates or polymethacrylates or their mixtures, blends or alloys.

Polyesters (PES) may be homo- or copolyesters which are composes of aliphatic, cycloaliphatic or aromatic dicarboxylic acids and diols or hydroxycarboxylic acids.

The aliphatic dicarboxylic acids may contain 2 to 40 carbon atoms, the cycloaliphatic dicarboxylic acids may contain 6 to 10 carbon atoms, the aromatic dicarboxylic acids may contain 8 to 14 carbon atoms, the aliphatic hydroxycarboxylic acids may contain 2 to 12 carbon atoms, and the aromatic as well as the cycloaliphatic hydroxycarboxylic acids may contain 7 to 14 carbon atoms.

The aliphatic diols may contain 2 to 12 carbon atoms, the cycloaliphatic diols may contain 5 to 8 carbon atoms, and the aromatic diols can contain 6 to 16 carbon atoms.

Aromatic diols are those, wherein two hydroxyl groups are bound to one or different aromatic hydrocarbon radicals.

It is also possible that the polyesters are branched with small amounts, e.g. from 0.1 to 3 mol %, based on the dicarboxylic acids present, of more than difunctional monomers (e.g. pentaerythritol, trimellitic acid, 1,3,5-tri(hydroxyphenyl)benzene, 2,4-dihydroxybenzoic acid or 2-(4-hydroxyphenyl)-2-(2,4-dihydroxyphenyl)propane).

In polyesters consisting of at least 2 monomers, these can be randomly distributed or may be block copolymers.

Suitable dicarboxylic acids are linear and branched saturated aliphatic dicarboxylic acids, aromatic dicarboxylic acids, and cycloaliphatic dicarboxylic acids.

Aliphatic dicarboxylic acids are suitably those containing 2 to 40 carbon atoms, typically oxalic acid, malonic acid, dimethylmalonic acid, succinic acid, pimelic acid, adipic acid, trimethyl-adipic acid, sebacic acid, azelaic acid and dimeric acids (dimerisation products of unsaturated aliphatic carboxylic acids such as oleic acid), alkylated malonic and succinic acids such as octadecylsuccinic acid.

Suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-(dicarboxyl-methyl)cyclohexane, 4,4'-dicyclohexyldicarboxylic acid.

Suitable aromatic dicarboxylic acids are: Preferably terephthalic acid, isophthalic acid, o-phthalic acid as well as 1,3-, 1,4-, 2,6- or 2,7-naphthalenedicarboxylic acid, 4,4'-diphenyldi-carboxylic acid, 4,4'-diphenylsulfonedicarboxylic acid, 4,4'-benzophenonedicarboxylic acid, 1,1,3-trimethyl-5-carboxyl-3-(p-carboxylphenyl)indane, 4,4'-diphenyl ether dicarboxylic acid, bis-p(carboxylphenyl)methane, or bis-p(carboxylphenyl)ethane.

The aromatic dicarboxylic acids are preferred and of these, in particular, terephthalic acid, isophthalic acid and 2,6-naphthalenedicarboxylic acid.

Further suitable dicarboxylic acids are those containing —CO—NH groups; they are disclosed in DE-A-2 414 349. Dicarboxylic acids containing N-heterocyclic rings are also suitable, for example those which are derived from carboxylalkylated, carboxylphenylated or carboxybenzylated monoamine-s-triazinedicarboxylic acids (see DE-A-2 121 184 and 2 533 675), mono- or bishydantoins, benzimidazoles which may be halogenated, or parabanic acid. The carboxyalkyl groups can in this case contain 3 to 20 carbon atoms.

Suitable aliphatic diols are the linear and branched aliphatic glycols, preferably those of 2 to 12, preferably 2 to 6, carbon atoms in the molecule, for example: ethylene glycol, 1,2- and 1,3-propylene glycol, 1,2-, 1,3-, 2,3- or 1,4-butanediol, pentyl glycol, neopentyl glycol, 1,6-hexanediol, 1,12-dodecanediol. A suitable cycloaliphatic diol is, for example, 1,4-dihydroxy-cyclohexane. Further suitable aliphatic diols are typically 1,4-bis(hydroxymethyl)cyclohexane, aromatic-aliphatic diols, such as p-xylylene glycol or 2,5-dichloro-p-xylylene glycol, 2,2-(β-hydroxyethoxyphenyl)propane as well as polyoxyalkylene glycols, such as diethylene glycol, triethylene glycol, polyethylene glycol or polypropylene glycol. The alkylenediols are preferably linear and preferably contain 2 to 4 carbon atoms.

Preferred diols are the alkylenediols, 1,4-dihydroxycyclohexane and 1,4-bis(hydroxymethyl)-cyclohexane. Ethylene glycol, 1,4-butanediol as well as 1,2- and 1,3-propylene glycol are particularly preferred.

Further suitable aliphatic diols are the β-hydroxyalkylated, preferably β-hydroxyethylated, bis-phenols such as 2,2-bis[4'-(β-hydroxyethoxy)phenyl]propane. Further bisphenols as indicated later.

Another group of suitable aliphatic diols are the heterocyclic diols disclosed in the German specifications 1 812 003, 2 342 432, 2 342 372 and 2 453 326. Illustrative examples are: N,N'-bis(β-hydroxyethyl)-5,5-dimethyl hydantoin, N,N'-bis(β-hydroxypropyl)-5,5-dimethyl-hydantoin, methylenebis[N-(β-hydroxyethyl)-5-methyl-5-ethylhydantoin], methylenebis[N-(β-hydroxyethyl)-5,5-dimethylhydantoin], N,N'-bis(β-hydroxyethyl)benzimidazolone, N,N'-bis(β-hydroxyethyl)-(tetrachloro)benzimidazolone, or N,N'-bis(β-hydroxyethyl)-(tetrabromo)benzimidazolone.

Suitable aromatic diols are mononuclear diphenols and, preferably, binuclear diphenols, which carry a hydroxyl group at each aromatic nucleus. Aromatic will preferably be understood as meaning aromatic hydrocarbon radicals such as phenylene or naphthylene. In addition to, for example, hydroquinone, resorcinol or 1,5-, 2,6- and 2,7-dihydroxynaphthalene, those bisphenols merit particular mention which can be illustrated by the following formulae:

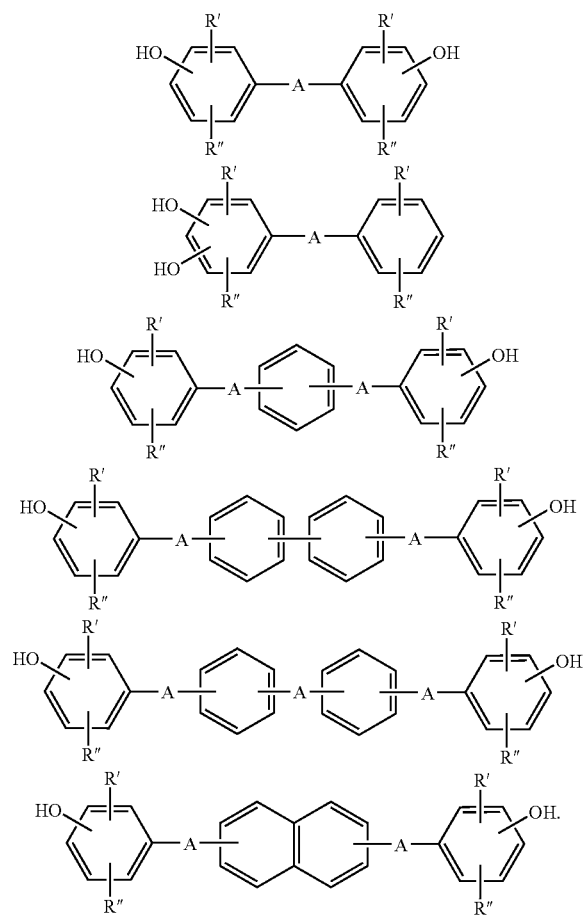

The hydroxyl groups can be in m-position, preferably in p-position, R' and R" in these formulae may be alkyl of 1 to 6 carbon atoms, halogen such as chloro or bromo and, preferably, hydrogen atoms. A can be a direct bond, or oxygen, sulfur, —SO—, —SO$_2$—,

—P(O)(C$_1$-C$_{20}$alkyl)-, unsubstituted or substituted alkylidene, cycloalkylidene or alkylene.

Typical examples of unsubstituted or substituted alkylidene are ethylidene, 1,1- or 2,2-propylidene, 2,2-butylidene, 1,1-isobutylidene, pentylidene, hexylidene, heptylidene, octylidene, dichloroethyl idene, trichloroethylidene.

Typical examples of unsubstituted or substituted alkylene are methylene, ethylene, phenyl-methylene, diphenylmethylene, methylphenylmethylene. Typical examples of cycloalkylidene are cyclopentylidene, cyclohexylidene, cycloheptylidene and cyclooctylidene.

Illustrative examples of bisphenols are: bis(p-hydroxyphenyl)ether or bis(p-hydroxyphenyl)-thioether, bis(p-hydroxyphenyl)sulfone, bis(p-hydroxyphenyl)methane, bis(4-hydroxyphenyl)-2,2'-biphenyl, phenylhydroquinone, 1,2-bis(p-hydroxyphenyl)ethane, 1-phenyl-bis(p-hydroxy-phenyl)methane, diphenyl-bis(p-hydroxyphenyl)methane, diphenyl-bis(p-hydroxyphenyl)-ethane, bis(3,5-dimethyl-4-hydroxyphenyl)sulfone, bis(3,5-dimethyl-4-hydroxyphenyl)-p-diisopropylbenzene, bis(3,5-dimethyl-4-hydroxyphenyl)-m-diisopropylbenzene, 2,2-bis(3',5'-dimethyl-4'-hydroxyphenyl)propane, 1,1- or 2,2-bis(p-hydroxyphenyl)butane, 2,2-bis(p-hydroxyphenyl)hexafluoropropane, 1,1-dichloro- or 1,1,1-trichloro-2,2-bis(p-hydroxyphenyl)ethane, 1,1-bis(p-hydroxyphenyl)cyclopentane and, preferably, 2,2-bis(p-hydroxyphenyl)propane (bisphenol A) and 1,1-bis(p-hydroxyphenyl)cyclohexane (bisphenol C).

Suitable polyesters of hydroxycarboxylic acids are typically polycaprolactone, polypivalolactone or the polyesters of 4-hydroxycyclohexanecarboxylic acid or 4-hydroxybenzoic acid.

Polymers which are also suitable are those predominantly containing ester bonds, but which can also contain other bonds, e.g. polyester amides or polyester imides.

Polyesters containing aromatic dicarboxylic acids have become of the greatest importance, especially the polyalkylene terephthalates. Those novel moulding compounds are therefore preferred, wherein the polyester is composed of at least 30 mol %, preferably of at least 40 mol %, of aromatic dicarboxylic acids, and of at least 30 mol %, preferably of at least 40 mol %, of alkylenediols which preferably contain 2 to 12 carbon atoms, based on the polyester.

In this case the alkylenediol is preferably linear and contains 2 to 6 carbon atoms, typically ethylene-, tri-, tetra- or hexamethylene glycol, and the aromatic dicarboxylic acid terephthalic acid and/or isophthalic acid.

Particularly suitable polyesters are PEN, PTT, PET, PETG (glycol-modified polyethylene terephthalate) or PBT and corresponding copolymers or blends thereof. PET and its copolymers are particularly preferred.

As esters of carboxylic acid, polycarbonates (PC) are the simplest polyesters. Polycarbonates are obtained, for example from bisphenol A and phosgene or phosgene-analogon such as trichloromethylchloroformate, triphosgene or diphenylcarbonate by condensation, in the latter case usually with addition of a suitable transesterification catalyst, for example a boron hydride, an amine, e.g. 2-methylimidazole, or a quaternary ammonium salt. In addition to bisphenol A, other bisphenol components can also be used, and it is also possible to use monomers which are halogenated in the benzene nucleus. Particularly suitable bisphenol components to be mentioned are: 2,2-bis(4'-hydroxyphenyl)propane (bisphenol A), 2,4'-di-hydroxydiphenylmethane, bis(2-hydroxyphenyl)methane, bis(4-hydroxyphenyl)methane, bis-(4-hydroxy-5-propylphenyl)methane, 1,1-bis(4'-hydroxyphenyl)ethane, bis(4-hydroxyphenyl)-cyclohexylmethane, 2,2-bis(4'-hydroxyphenyl)-1-phenylpropane, 2,2-bis(3',5'-dimethyl-4'-hydroxyphenyl)propane, 2,2-bis(3',5'-dibromo-4'-hydroxyphenyl)propane, 2,2-bis(3',5'-dichloro-4'-hydroxyphenyl)propane, 1,1-bis(4'-hydroxyphenyl)cyclododecane, 1,1-bis(3',5'-dimethyl-4'-hydroxyphenyl)cyclododecane, 1,1-bis(4'-hydroxyphenyl)-3,3,5-trimethylcyclohexane, 1,1-bis(4'-hydroxyphenyl)-3,3,5,5-tetramethylcyclohexane or 1,1-bis(4'-hydroxyphenyl)-3,3,5-trimethylcyclopentane. The polycarbonates can be branched by suitable amounts of more than difunctional monomers (examples as stated above).

In addition to blends of PES and PC, i.e. in particular PBT/PC and PET/PC, polymers to be used according to this invention are suitably also PC/ABS and ternary blends, such as blends of PBT/PC/ABS, PBT/PET/PC, PBT/PET/PC/ABS or PBT/PC/ASA.

The blends are prepared in customary manner from the starting polymers. The preferred PES component is PBT and the preferred PC component is a PC based on bisphenol A. The ratio of PES to PC is preferably from 95:5 to 5:95, a ratio wherein one component provides at least 70% being particularly preferred.

Owing to transesterification reactions, all PES/PC blends usually comprise are more or less large proportion of block copolymer structures, i.e. part of the blend is in the form of a PC/PES block copolymer. The inventive enhancement of the properties increases the compatibility of the polymers with one another. However, it is also possible to increase the compatibility with so-called compatibilisers. In the present case, these may be, for example, polyester/polycarbonate copolymers or also polyarylates (=aromat. polyester).

To be singled out for special mention is the efficacy of the novel compounds of the formula I as reducers of surface energy of the organic materials. Organic materials with low surface energy have intrinsically better properties like for example water and oil repellency, hydrophobicity, barrier properties, easy to clean, self cleaning, antigraffiti or solvent resistance.

The compounds of the formula I will preferably be added to the organic material to be treated in concentrations of 0.1 to 20%, preferably 0.1 to 10%, typically 1 to 5%, based on the weight of said material.

In addition to comprising the compounds of the formula I, the inventive compositions may comprise further additives, typically the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methyl phenol, 2,4,6-tricyclohexyl phenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctyl-thiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2, 2'-thiobis(6-tert-butyl-4-methylphenol), 2,2'-thiobis(4-octyl phenol), 4,4'-thiobis(6-tert-butyl-3-methyl phenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2, 2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopenta-diene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.7. O—, N—and S-benzyl compounds, for example 3, 5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1, 3,5-tris(3,5-di-tert-butyl-4-hydroxy-benzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxy-anilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl)iso-cyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or poly-hydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxy-phenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic Acid (Vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenyl-amine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylamino-methylphenol, 2,4'-diaminodiphenylmethane, 4,4'-diaminodiphenyl methane, N,N,N',N'-tetra-methyl-4,4'-diaminodiphenylmethane, 1,2-bis[(2-methylphenyl)amino]ethane, 1,2-bis(phenyl-amino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenyl-amines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetra-methylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilizers 2.1. 2-(2'-Hydroxyphenyl)benzotriazoles, for example 2-(2'-hydroxy-5'-methylphenyl)benzo-triazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl- 2'-hydroxy-5'-(2-octyloxycarbonylethyl)phenyl)-5-chlorobenzotriazole, 2-(3'-tert-butyl-5'-[2-(2-ethylhexyl-oxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonyl-ethyl)phenyl)benzotriazole, 2-(3'-tert-butyl-5'-[2-(2-ethylhexyloxy)carbonylethyl]-2'-hydroxy-phenyl)benzotriazole, 2-(3'-dodecyl-2'-hydroxy-5'-methylphenyl)benzotriazole, 2-(3'-tert-butyl-2'-hydroxy-5'-(isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

$$[R\text{---}CH_2CH_2\text{---}COO\text{---}CH_2CH_2]_2\text{---},$$

where R=3'-tert-butyl-4'-hydroxy-5'-2H-benzotriazol-2-ylphenyl, 2-[2'-hydroxy-3'-(α,α-dimethyl benzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl] benzotriazole.

2.2. 2-Hydroxybenzophenones, for example the 4-hydroxy, 4-methoxy, 4-octyloxy, 4-decyl-oxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butyl phenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-di-chloro-1,3,5-triazine, tris(2,2,6,6-tetramethyl-4-piperidyl)nitrilotriacetate, tetrakis(2,2,6,6-tetra-methyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyl-oxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylene-diamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-tri-chloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-d i-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyl-oxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2- hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethyl-phenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydro-oxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2-[2-hydroxy-4-(2-ethylethoxy)phenyl]-4,6-diphenyl-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenyl-propionyl)hydrazine, 3-salicyloylamino-1,2,4-triazole, bis(benzylidene)oxalyl dihydrazide, oxanilide, isophthaloyl dihydrazide, sebacoyl bisphenyl hydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,4-di-cumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo-[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

5. Hydroxylamines, for example N,N-dibenzylhydroxylamine, N,N-diethyl hydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-hepta-decylnitrone, N-octadecyl-alpha-hexadecylnitrone, nitrone derived from N N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercapto-benzimidazole, zinc dibutyldithiocarbamate, dioctadecyl disulfide, pentaerythritol tetrakis(β-dodecylmercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyl-dibenzyl idene)sorbitol, and 1,3:2,4-di(benzyl idene)sorbitol.

12. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents blowing agents and infrared (IR) adsorbers.

Preferred IR absorbers are for example pigments, dyes or organometallic compounds. Examples of such pigments are for example disclosed in JP-A-2003221523. Examples of IR absorbing dyes are disclosed for example in JP-A-2003327865 or EP-A-1 306 404. IR absorbing organometallic compounds are for example disclosed in EP-A-1 266 931 or Chemical Abstract 117; 112529.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839; EP-A-0591102 or EP-A-1291384 or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)-benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethyl phenyl)-5,7-di-tert-butyl benzofuran-2-one, 3-(2,3-dimethylphenyl)-5,7-di-tert-butylbenzofuran-2-one or 3-(2-acetyl-5-isooctylphenyl)-5-iso-octyl benzofuran-2-one.

The further additives are typically used in concentrations of 0.01 to 10%, based on the total weight of the material to be treated.

The novel compounds of the formula I can be used in particular together with phenolic antioxidants, light stabilizers and/or processing stabilizers.

Incorporation of component (b) and, if desired, further additives into the synthetic polymers is carried out by known methods, for example before or during compounding, extrusion, co-extrusion or else by applying the dissolved or dispersed compounds to the synthetic polymer, if appropriate with subsequent slow evaporation of the solvent.

The present invention also relates to a composition in the form of a masterbatch or concentrate comprising component (a) in an amount of from 5 to 90% and component (b) in an amount of from 5 to 80% by weight.

Component (b) and, if desired, further additives, can also be added before or during polymerisation or before crosslinking.

Component (b), with or without further additives, can be incorporated in pure form or encapsulated in waxes, oils or polymers into the synthetic polymer.

Component (b), with or without further additives, can also be sprayed onto the synthetic polymer. It is able to dilute other additives (for example the conventional additives indicated above) or their melts so that they too can be sprayed together with these additives onto the polymer. Addition by spraying on during the deactivation of the polymerization catalysts is particularly advantageous, it being possible to carry out spraying using, for example, the steam used for deactivation.

In the case of spherically polymerized polyolefins it may, for example, be advantageous to apply component (b), with or without other additives, by spraying.

The synthetic polymers prepared in this way can be employed in a wide variety of forms, for example as foams, films, fibres, tapes, moulding compositions, as profiles or as binders for coating materials, especially powder coatings, adhesives, putties or especially as thick-layer polyolefin mouldings which are in long-term contact with extractive media, such as, for example, pipes for liquids or gases, films, fibres, geomembranes, tapes, profiles or tanks.

The preferred thick-layer polyolefin mouldings have a layer thickness of from 1 to 50 mm, in particular from 1 to 30 mm, for example from 2 to 10 mm.

The compositions according to the invention can be advantageously used for the preparation of various shaped articles. Examples are:

I-1) Floating devices, marine applications, pontoons, buoys, plastic lumber for decks, piers, boats, kayaks, oars, and beach reinforcements.
I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.
I-3) Road traffic devices, in particular sign postings, posts for road marking, car accessories, warning triangles, medical cases, helmets, tires.
I-4) Devices for plane, railway, motor car (car, motorbike) including furnishings.
I-5) Devices for space applications, in particular rockets and satellites, e.g. reentry shields.
I-6) Devices for architecture and design, mining applications, acoustic quietized systems, street refuges, and shelters.
II-1) Appliances, cases and coverings in general and electric/electronic devices (personal computer, telephone, portable phone, printer, television-sets, audio and video devices), flower pots, satellite TV bowl, and panel devices.
II-2) Jacketing for other materials such as steel or textiles.
II-3) Devices for the electronic industry, in particular insulation for plugs, especially computer plugs, cases for electric and electronic parts, printed boards, and materials for electronic data storage such as chips, check cards or credit cards.
II-4) Electric appliances, in particular washing machines, tumblers, ovens (microwave oven), dish-washers, mixers, and irons.
II-5) Covers for lights (e.g. street-lights, lamp-shades).
II-6) Applications in wire and cable (semi-conductor, insulation and cable-jacketing).
II-7) Foils for condensers, refrigerators, heating devices, air conditioners, encapsulating of electronics, semi-conductors, coffee machines, and vacuum cleaners.
III-1) Technical articles such as cogwheel (gear), slide fittings, spacers, screws, bolts, handles, and knobs.
III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.
III-3) Sanitary articles, in particular shower cubicles, lavatory seats, covers, and sinks.
III-4) Hygienic articles, in particular diapers (babies, adult incontinence), feminine hygiene articles, shower curtains, brushes, mats, tubs, mobile toilets, tooth brushes, and bed pans.
III-5) Pipes (cross-linked or not) for water, waste water and chemicals, pipes for wire and cable protection, pipes for gas, oil and sewage, guttering, down pipes, and drainage systems.
III-6) Profiles of any geometry (window panes) and siding.
III-7) Glass substitutes, in particular extruded or co-extruded plates, glazing for buildings (monolithic, twin or multi-wall), aircraft, schools, extruded sheets, window film for architectural glazing, train, transportation, sanitary articles, and greenhouse.
III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.
III-9) Intake and outlet manifolds.
III-10) Cement-, concrete-, composite-applications and covers, siding and cladding, hand rails, banisters, kitchen work tops, roofing, roofing sheets, tiles, and tarpaulins.
IV-1) Plates (walls and cutting board), trays, artificial grass, astroturf, artificial covering for stadium rings (athletics), artificial floor for stadium rings (athletics), and tapes.
IV-2) Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sunshields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, $TiO_2$, mica, nanocomposites, dolomite, silicates, glass, asbestos).

Thus, a further embodiment of the present invention relates to a shaped article, in particular a film, pipe, profile, bottle, tank or container, fiber containing a composition as described above.

A further embodiment of the present invention relates to a molded article containing a composition as described above. The molding is in particular effected by injection, blow, compression, roto-molding or slush-molding or extrusion.

The present invention also relates to a process for reducing the surface energy of organic materials which comprises incorporating therein or applying thereto at least one compound of the formula I.

The preferred compounds of the formula I and optionally further additives, in the process for reducing the surface energy of organic materials are the same as those described for the composition.

A preferred embodiment of the present invention is also the use of a compound of the formula I as reducer of surface energy for organic materials.

The following examples illustrate the invention further. Parts or percentages relate to weight.

EXAMPLE 1

Preparation of a Polysiloxane Terminated Oligocarbonate from Hydroxy Terminated Bisphenol a Oligocarbonate (m=11) and a Mono Hydroxy Polysiloxane (p=10) of Formula A

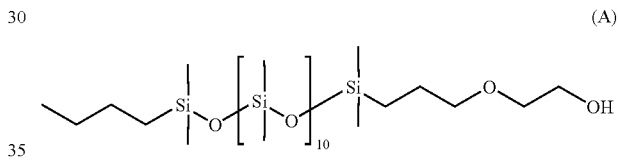

(A)

To a solution of 25 g of mono hydroxy polysiloxane (Mn=878 g/mol) [α-butyl-ω-[3-(2'-hydro-oxyethoxy)propyl]-polydimethylsiloxane from Chisso Corp.] and 11.22 g of bis(2,4-dinitro-phenyl) carbonate (DNPC) in 200 ml of 1,2-dichloroethane is added dropwise a solution of 4.32 ml of triethylamine in 50 ml of 1,2-dichloroethane at room temperature under stirring during one hour. The reaction mixture is further stirred for 30 minutes and then slowly dropped to a solution of 4.32 ml of triethylamine, 0.2 g of 4-(dimethylamino)pyridine and 34.96 g of a bisphenol A oligocarbonate (Mn=2700; m=11) in 200 ml of 1,2-dichloroethane at room temperature during 2 hours. The stirring is continued for one hour. The reaction mixture is worked up by concentrating the reaction mixture to 200 ml and then precipitating the product into methanol (2 liter) with stirring. The precipitated product is filtered and washed several times with methanol till it loses yellow colour and becomes white. The product is then dried under vacuum at 60° C. for 24 hours to constant weight to yield 51.6 g of a white solid.

EXAMPLE 2

Preparation of a Polysiloxane Terminated Oligocarbonate from Hydroxy Terminated Bisphenol A Oligocarbonate (m=13) and a Mono Hydroxy Polysiloxane (p=10) of Formula A To a solution of 16 g of mono hydroxyl polysiloxane (Mn=878 g/mol) [α-butyl-ω-[3-(2'-hydro-oxyethoxy)propyl]-polydimethylsiloxane from Chisso Corp.] and 7.33 g of bis(2,4-dinitrophenyl) carbonate (DNPC) in 100 ml of dichloromethane is added dropwise a solution of 3.0 ml of triethylamine in 30 ml of dichloromethane at room temperature under stirring during one hour. The reaction mixture is further stirred for 20 minutes and then dropped to a solution of 3.0 ml of triethylamine, 0.1 g of 4-(dimethylamino)pyridine and 26.12 g of a bisphenol A oligo-carbonate (Mn=3296; m=13) in 250 ml of dichloromethane at room temperature during 2.5 hours. The stirring is continued for 30 minutes. The reaction mixture is worked up by concentrating the reaction mixture to 250 ml and then precipitating the product into methanol (2.5 liter) with stirring. The precipitated product is filtered and washed several times with methanol till it loses yellow colour and becomes white. The product is then dried under vacuum at 60° C. for 24 hours to constant weight to yield 36.5 g of a white solid.

EXAMPLE 3

Preparation of a Polysiloxane Terminated Oligocarbonate from Hydroxy Terminated Bisphenol a Oligocarbonate (m=19) and a Mono Hydroxy Polysiloxane (p=10) of Formula A To a solution of 12.5 g of mono hydroxyl polysiloxane (Mn=878 g/mol) [see Example 1] and 5.61 g of bis(2,4-dinitrophenyl)carbonate (DNPC) in 100 ml of dichloromethane is added dropwise a solution of 2.2 ml of triethylamine in 25 ml of dichloromethane at room temperature under stirring during 1.4 hour. The reaction mixture is further stirred for 30 minutes and then dropped to a solution of 2.2 ml of triethylamine, 0.081 g of 4-(dimethylamino)pyridine and 30.96 g of a bisphenol A oligocarbonate (Mn=4784; m=19) in 250 ml of dichloromethane at room temperature during one hour. The stirring is continued for one hour. The reaction mixture is worked up by concentrating the reaction mixture to 200 ml and then precipitating the product into methanol (2 liter) with stirring. The precipitated product is filtered and washed several times with methanol till it loses yellow colour and becomes white. The product is then dried under vacuum at 60° C. for 24 hours to constant weight to yield 40 g of a white solid.

EXAMPLE 4

Preparation of a Polysiloxane Terminated Oligocarbonate from Hydroxy Terminated Bisphenol A Oligocarbonate (m=27) and a Mono Hydroxy Polysiloxane (p=10) of Formula A To a solution of 20 g of mono hydroxyl polysiloxane (Mn=878 g/mol) [see Example 1] and 9.16 g of bis(2,4-dinitrophenyl)carbonate (DNPC) in 200 ml of dichloromethane is added dropwise a solution of 5.0 ml of triethylamine in 40 ml of dichloromethane at room temperature under stirring during 1.25 hour. The reaction mixture is further stirred for 15 minutes and then dropped to a solution of 5.0 ml of triethylamine, 0.15 g of 4-(dimethylamino)pyridine and 60.82 g of a bisphenol A oligocarbonate (Mn=6941; m=27) in 500 ml of dichloromethane at room temperature during 1.5 hour. The stirring is continued for one hour. The reaction mixture is worked up by slow addition of 2.5 liters of methanol to the reaction mixture with stirring. The precipitated product is filtered and washed several times with methanol till it loses yellow colour and becomes white. The product is then dried under vacuum at 40° C. for 24 hours to constant weight to yield 77 g of a white solid.

EXAMPLE 5

Preparation of a Polysiloxane Terminated Oligocarbonate from Hydroxy Terminated Bisphenol A Oligocarbonate (m=37) and a Mono Hydroxy Polysiloxane (p=10) of Formula A To a solution of 91.4 g of mono hydroxyl polysiloxane (Mn=878 g/mol) [see Example 1] and 41.87 g of bis(2,4-dinitrophenyl)carbonate (DNPC) in 1000 ml of dichloromethane is added dropwise a solution of 20.7 ml of triethylamine in 250 ml of dichloromethane at room temperature under stirring during one hour. The reaction mixture is further stirred for 30 minutes and then dropped to a solution of 20.7 ml of triethylamine, 0.64 g of 4-(dimethylamino)pyridine and 100 g of a bisphenol A oligocarbonate (Mn=9458; m=37) in 1500 ml of dichloro-methane at room temperature during 1.5 hour. The stirring is continued over night. The reaction mixture is worked up by slow addition of 3.2 liters of methanol to the reaction mixture with stirring. The precipitated product is filtered and washed several times with methanol till it loses yellow colour and becomes white. The product is then dried under vacuum at 40° C. for 6 hours. This dried product is slurried with 4.5 liters of hexane for 1.5 hours. The upper layer is decanted and the residue again dried under vacuum at 40° C. for 24 hours to constant weight to yield 362 g of a white solid.

EXAMPLE 6

Preparation of a Polysiloxane Terminated Oligocarbonate from Hydroxy Terminated Bisphenol A Oligocarbonate (m=11) and a Mono Hydroxy Polysiloxane (p=64) Formula B

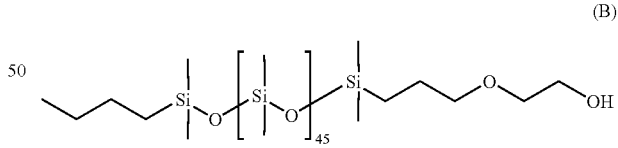

(B)

To a solution of 149.7 g of mono hydroxy polysiloxane (Mn=5000 g/mol) [α-butyl-ω-[3-(2'-hydroxyethoxy)propyl]-polydimethylsiloxane from Chisso Corp.] and 11.79 g of bis(2,4-dinitrophenyl) carbonate (DNPC) in 200 ml of dichloromethane is added dropwise a solution of 4.5 ml of triethylamine in 50 ml of dichloromethane at room temperature under stirring during 1.5 hours. The reaction mixture is further stirred for 30 minutes and then dropped to a solution of 4.5 ml of triethylamine, 80 mg of 4-(dimethylamino)pyridine and 30 g of a bisphenol A oligocarbonate (Mn=2605; m=27) in 250 ml of dichloromethane at room temperature during 2.5 hours. The stirring is continued for 2 hours. The reaction mixture is washed first with 1N HCl and then with 0.05N NaOH. The reaction mixture is dumped on methanol to obtain a semisolid compound. The product is then dried under vacuum at 40° C. for 24 hours to constant weight to yield 131 g of a white solid.

EXAMPLE 7

Preparation of a Polysiloxane Terminated Oligocarbonate from Hydroxy Terminated Bisphenol A Oligocarbonate (m=88) and a Mono Hydroxy Polysiloxane (p=64) of Formula B Part I: 42.5 g of bisphenol A oligocarbonate (Mn=3168) is dissolved in 200 ml of 1,2-dichloroethane at 78° C. The solution is allowed to cool at 60° C. and then 4.29 g of bis(2,4-dinitro-phenyl)carbonate (DNPC) and 84 mg of 4-(dimethylamino)pyridine are added under stirring. The reaction temperature is increased to 78° C. and the reaction mixture is treated with a solution of 5 ml of triethylamine in 50 ml of 1,2-dichloroethane (50 ml) dropwise during 40 minutes. The reaction mixture is kept stirring at 78° C. for another 30 minutes. The reaction mixture is then allowed to cool at room temperature.

Part II: To a solution of 80 g of mono hydroxy polysiloxane (Mn=5000 g/mol) [see Example 6] and 6.44 g of bis(2,4-dinitrophenyl)carbonate (DNPC) in 200 ml of 1,2-dichloroethane is added a solution of 3.5 ml of triethylamine in 50 ml of 1,2-dichloroethane dropwise at room temperature under stirring during 1 hour. The reaction mixture is further stirred for 50 minutes, treated with 3.5 ml of triethylamine and 105 mg of 4-(dimethylamino)pyridine and then dropped to the reaction mixture of Part I at room temperature during 2 hours. After 1 hour of addition, additionally 200 ml of dichloromethane is added to the reaction mixture. The stirring is continued for 30 minutes. The reaction mixture is worked up by washing the reaction mixture with 1 N HCl (1 liter) solution and successive five 1 liter washings of 5% sodium bicarbonate solution till the reaction mixture becomes colorless. This solution is then treated with sodium sulfate and neutral alumina to further remove the colored impurities. The reaction mixture is concentrated by solvent evaporation. The residue is dissolved again in 500 ml of dichloromethane and precipitated with 2 liter of methanol. The product is filtered and dried under vacuum at 40° C. for 24 hours to constant weight to yield 51 g of a white solid.

EXAMPLE 8

Preparation of Carbonic acid bis-{4-[1-methyl-1-(4-triethylsilanyloxy-phenyl)-ethyl]-phenyl}ester of the formula Ia 250 g of 4-[1-Methyl-1-(4-triethylsilanyloxy-phenyl)-ethyl]-phenol and 129.2 g of bis(2,4-dinitrophenyl)carbonate (DNPC) are dissolved in 2000 ml of 1,2-dichloroethane. A solution of 90.75 ml of triethyl amine in 500 ml of dichloroethane is added under stirring dropwise to the reaction mixture under nitrogen atmosphere at 0-5° C. over a period of 1 hour. Then 4.0 g of 4-(dimethylamino)pyridine is added to the reaction mixture and the stirring is continued for another hour. The reaction mixture is worked up by washing the reaction mixture with 1 N HCl (1 liter) solution and successive two 1.5 liter washings of 0.5 N sodium hydroxide solution. The organic layer is then dried over anhydrous sodium sulfate and concentrated under vacuum to get crude compound. The residue is filtered through silica gel using as eluent ethyl acetate/hexane to give 170 g of a white solid.

EXAMPLE 9

Preparation of a Polysiloxane Terminated Oligocarbonate from Hydroxy Terminated Bisphenol A Oligocarbonate (m=11) and Polyalkyleneoxide Modified Heptamethyltrisiloxane of the formula C

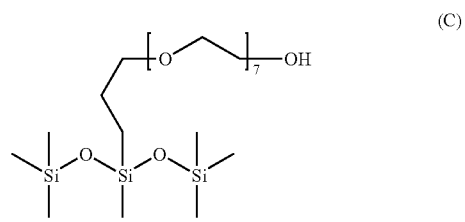

To a solution of 58.7 g of polyalkyleneoxide modified heptamethyltrisiloxane of the formula C [C.A. 67674-67-3] and 39.33 g of bis(2,4-dinitrophenyl)carbonate (DNPC) in 400 ml of dichloromethane is added a solution of 14.95 ml of triethyl amine in 100 ml of dichloromethane dropwise under stirring to the reaction mixture at room temperature during one hour. The stirring of the reaction mixture is continued for 30 minutes and then added dropwise to a solution of 14.95 ml of triethylamine, 270 mg of 4-(dimethylamino)pyridine and 100 g of a bisphenol A oligocarbonate (Mn=2605) in 500 ml of dichloromethane during 2.5 hours. The reaction mixture is stirred overnight. The reaction mixture is worked up by washing the reaction mixture with 1 liter of 1 N HCl solution and successive four 0.5 liter washings of 0.5 N sodium hydroxide solution till the reaction mixture becomes colorless. This solution is then dried over anhydrous sodium sulfate and concentrated under vacuum. Then 500 ml of methanol is

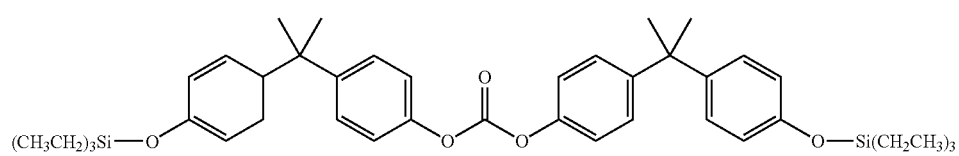

slowly added. The precipitated product is filtered and dried under vacuum at 40° C. for 24 hours to constant weight to yield 133 g of a white solid.

EXAMPLE 10

Preparation of a Polysiloxane Terminated Oligocarbonate from Hydroxy Terminated Bisphenol A Oligocarbonate (m=11) and 3-(polyoxyethylene)propylheptamethyltrisiloxane of the Formula D

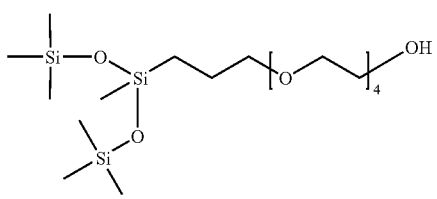

(D)

To a solution of 45.59 g of 3-(polyoxyethylene)propylheptamethyltrisiloxane of the formula D and 39.33 g of bis(2,4-dinitrophenyl)carbonate (DNPC) in 400 ml of dichloromethane is added a solution of 14.95 ml of triethyl amine in 100 ml of dichloromethane is added dropwise under stirring to the reaction mixture at room temperature during one hour. The stirring of the reaction mixture is continued for 30 minutes. The reaction mixture is then added drop-wise to a solution of 14.95 g of triethylamine, 270 mg of 4-(dimethylamino)pyridine and 100 g of bisphenol A oligomer (Mn=2605) in 500 ml of dichloromethane during 2.5 hours. The reaction mixture is stirred overnight. The reaction mixture is worked up by washing the reaction mixture with 1 liter of 1 N HCl solution and successive four 0.5 liter washings of 0.5 N sodium hydroxide solution till the reaction mixture is colorless. This solution is then dried over anhydrous sodium sulfate and concentrated under vacuum. Then 500 ml of methanol is slowly added. The precipitated product is filtered and dried under vacuum at 40° C. for 24 hours to constant weight to yield 110 g of a white solid.

EXAMPLE 11

Preparation of 1,1,1-Tris {Carbonic acid-4-[1-methyl-1-(4-triethylsilanyloxyphenyl)ethyl]phenyl ester}-1-ethyl of the formula Ib To a solution of 25 g of 4-[1-methyl-1-(4-triethylsilanyloxyphenyl)ethyl]phenol (MW=342.55 g/mol) and 27.79 g of bis(2,4-dinitrophenyl)carbonate (DNPC) in 250 ml of 1,2-dichloro-ethane is added dropwise at room temperature under stirring a solution of 11.22 ml of tri-ethylamine in 50 ml of 1,2-dichloroethane for 40 minutes. The reaction mixture is further stirred for 20 minutes and then dropped to a solution of 11.22 ml of triethylamine, 150 mg of 4-(dimethylamino)pyridine and 6.58 g of 1,1,1-tris(4-hydroxyphenyl)ethane (MW=306.355) in 250 ml of 1,2-dichloroethane at room temperature during 1.25 hours. The stirring is continued for 1.25 hours. The reaction mixture is worked up by washing the reaction mixture with 0.1 N HCl (2 liter) solution and successive multiple washings, 2 liter each, of saturated sodium bicarbonate solution till the reaction mixture is colorless. The solvent is evaporated and the residue filtered through silica gel using ethyl acetate/hexane as eluent to give 15.2 g of a white solid.

EXAMPLE 12

Preparation of a Polysiloxane Terminated Oligocarbonate from Hydroxy Terminated Bisphenol A Oligocarbonate (m=19) and a Mono Hydroxy Polysiloxane (p=5) of the Formula E

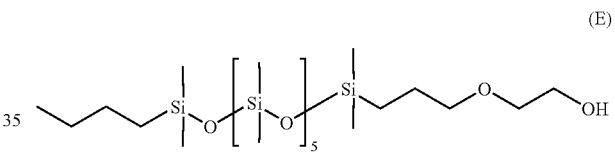

(E)

To a solution of 16 g of mono hydroxyl polysiloxane (Mn=662 g/mol) and 12.87 g of bis(2,4-dinitrophenyl)carbonate (DNPC) in 100 ml of dichloromethane is added dropwise a solution of 4.7 ml of triethylamine in 25 ml of dichloromethane at room temperature under stirring during 1.4 hour. The reaction mixture is further stirred for 30 minutes and then dropped to a solution of 4.7 ml of triethylamine, 0.1052 g of 4-(dimethylamino)pyridine and 59.14 g of a bis-phenol A oligocarbonate (Mn=4805; m=19) in 250 ml of dichloromethane at room temperature during one hour. The stirring is continued for one hour. The reaction mixture is worked up by washing the reaction mixture with two 500 ml of 0.5 N HCl solution and successive four 500 ml washings of 0.5 N sodium hydroxide solution till the reaction mixture becomes colorless. Finally organic layer is washed with water and then dried over anhydrous sodium sulfate. After concentration under vacuum, 500 ml of methanol is slowly added.

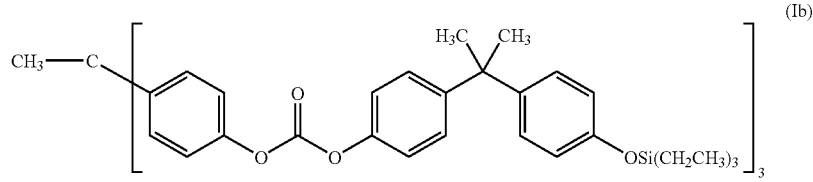

(Ib)

The precipitated product is filtered and dried under vacuum at 60° C. for 24 hours to constant weight to yield 69 g of a white solid.

EXAMPLE 13

Preparation of a Polysiloxane Terminated Oligocarbonate from Hydroxy Terminated Bisphenol A Oligocarbonate (m=20) and a Mono Hydroxy Polysiloxane (p=3) of the Formula F

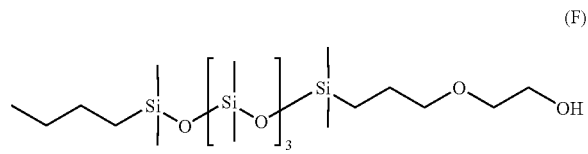

(F)

To a solution of 8 g of mono hydroxy polysiloxane (Mn=662 g/mol) and 6.43 g of bis(2,4-dinitrophenyl)carbonate (DNPC) in 100 ml of dichloromethane is added dropwise a solution of 6.36 ml of triethylamine in 25 ml of dichloromethane at room temperature under stirring during 1.4 hour. The reaction mixture is further stirred for 30 minutes and then dropped to a solution of 6.36 ml of triethylamine, 0.097 g of 4-(dimethylamino)pyridine and 28.18 g of a bisphenol A oligocarbonate (Mn=4932.65; m=20) in 150 ml of dichloromethane at room temperature during one hour. The stirring is continued for eighteen hour. The reaction mixture is worked up by washing the reaction mixture with two 250 ml of 0.5 N HCl solution and successive four 250 ml washings of 0.5 N sodium hydroxide solution till the reaction mixture becomes colorless. Finally organic layer is washed with water and then dried over anhydrous sodium sulfate. After concentration under vacuum, 250 ml of methanol is slowly added. The precipitated product is filtered and dried under vacuum at 60° C. for 24 hours to constant weight to yield 30 g of a white solid.

EXAMPLE 14

Preparation of a Polysiloxane Terminated Oligocarbonate from Hydroxy Terminated Bisphenol Z Oligocarbonate (m=9) and a Mono Hydroxy Polysiloxane (p=3) of the Formula F (Formula see Example 13)

To a solution of 26 g of mono hydroxy polysiloxane (Mn=662 g/mol) and 20.91 g of bis(2,4-dinitrophenyl)carbonate (DNPC) in 150 ml of dichloromethane is added dropwise a solution of 7.75 ml of triethylamine in 25 ml of dichloromethane at room temperature under stirring during 1.4 hour. The reaction mixture is further stirred for 30 minutes and then dropped to a solution of 7.75 ml of triethylamine, 0.054 g of 4-(dimethylamino)pyridine and 50 g of a bisphenol Z oligocarbonate (Mn=2490.64; m=9) in 175 ml of dichloromethane at room temperature during one hour. The stirring is continued for eighteen hour. The reaction mixture is worked up by washing the reaction mixture with two 250 ml of 0.5 N HCl solution and successive four 250 ml washings of 0.5 N sodium hydroxide solution till the reaction mixture becomes colorless. Finally organic layer is washed with water and then dried over anhydrous sodium sulfate. After concentration under vacuum, 300 ml of methanol is slowly added. The precipitated product is filtered and dried under vacuum at 40° C. for 24 hours to constant weight to yield 43.3 g of an off white solid.

EXAMPLE 15

Processing of Polycarbonate Tapes Containing the Oligo- and Poly-Carbonates Terminated with Silicon Containing Groups as Surface Modifiers In order to evaluate the surface properties of the new compounds of the formula I in polycarbonate tapes, they are incorporated in the polymer according to the following procedure:

A polycarbonate powder [Makrolon 3108 FBL (RTM) from Bayer] is dried in a vacuum oven for eight hours at 120° C. Appropriate amounts of each compound of the formula I is added to the dried polycarbonate powder to obtain formulations containing up to 10% by weight of the compound of the formula I. The formulations are mixed in a turbo mixer and extruded in a twin-screw extruder (Poly-Lab extruder from Thermo Electron Corporation) equipped with a flat die. In this way, polycarbonate tapes are produced with a width of 20 mm and a thickness of around 1 mm. The processing temperature is around 280° C. All produced tapes have a transparent visual appearance.

The contact angle of the produced polycarbonate tapes are measured with a Dataphysics OCA 30 contact angle device, using the sessile drop method and water as measuring liquid. The results are summarized in Table 1.

TABLE 1

| Example | Additive | Contact angle (°) |
|---|---|---|
| 15a[a)] | none | 85.7° |
| 15b[b)] | 0.5% Example 1 | 100.3° |
| 15c[b)] | 1.0% Example 3 | 102.5° |
| 15d[b)] | 1.0% Example 4 | 102.5° |
| 15e[b)] | 2.0% Example 4 | 103.2° |
| 15f[b)] | 1.0% Example 5 | 103.0° |
| 15g[b)] | 2.0% Example 5 | 103.9° |
| 15h[b)] | 3.0% Example 5 | 105.5° |
| 15i[b)] | 4.0% Example 5 | 106.1° |
| 13j[b)] | 5.0% Example 5 | 106.9° |

Explanation of footnotes [a)] and [b)] see end of Table 5.

EXAMPLE 16

Processing of Polycarbonate Extrusion Sheets Containing the Oligo- and Polycarbonates Terminated with Silicon Containing Groups as Surface Modifiers In order to evaluate the antiadhesion properties against microorganisms, oligo- and poly-carbonates terminated with silicon containing groups of the formula I are incorporated in poly-carbonate extrusion sheets according to the following procedure:

A polycarbonate powder [Makrolon 3108 FBL (RTM) from Bayer] is dried in a vacuum oven for eight hours at 120° C. Appropriate amounts of each compound of the formula I is added to the dried polycarbonate powder to obtain formulations containing up to 10% by weight of the compound of the formula I. The formulations are mixed in a Grindo Mix GM 200 and compounded to pellets in a twin-screw extruder (Haake DS16-L/D25 from Thermo Electron Corporation) and further extruded to sheets with a width of 110 mm and thickness of 0.2 mm using a single-screw extruder equipped with a flat die (Collin CR-136/350). The processing temperature is around 280° C. All produced sheets have a transparent visual appearance.

In order to measure the reduced adhesion of microbes onto polymer surfaces the following testing procedure is applied:

The test system is microtiterplate based and is conducted according to the method described in Nature Medicine Vol. 6, No. 8, 1053-1056. Samples equipped with active compounds and untreated control samples are prepared to obtain a same sample size of max. 7×4 mm. These test pieces are incubated in microtitre plates, one sample per well, in a suspension of bacteria (e.g. *Staphylococcus aureus*) or yeast strains for 60 min, then rinsed with PBS buffer. The microbial cells adhering to the pieces are detected in an immunological assay using specific antibodies against the test strain, which are then detected calorimetrically. The results on the samples equipped with test compounds are compared to those of the untreated control samples. The results are reported as a percent residual adhesion relative to the control samples, a value of 100% represents the value observed on the control samples. The results are summarized in Table 2. The lower the value the better.

TABLE 2

| | | *Staphylococcus aureus* ATCC 6538 |
|---|---|---|
| Example | Additive | Adhesion of *Staphylococcus aureus* ATCC 6538 on polycarbonate in % |
| 16a[a)] | None | 100 |
| 16b[a)] | 5% Tinuvin 1577[c)] | 104 |
| 16c[b)] | 5% Tinuvin 1577[c)] 3% Example 5 | 41 |
| 16d[b)] | 5% Tinuvin 1577[c)] 5% Example 5 | 18 |

Explanation of footnotes [a)], [b)] and [c)] see end of Table 5.

EXAMPLE 17

Reduced Adhesion of Algae onto Polycarbonate Surfaces

The purpose of this test is to determine the antiadhesion effect of polycarbonate foils prepared according to Example 16 towards algae and to prevent or reduce the algae growth on the surface of the foil. The growth in relation to blank polycarbonate foils without antiadhesive additives and to a growth control (glass slides roughened with abrasive paper) is determined over a test period of about 4 weeks, and thus over several algal generations.

Aquarium 1 is inoculated with *Haematococcus pluvialis* (Hp) and *Klebsormidium flaccidum* (Kf) [supplied by the "Sammlung von Algenkulturen, Pfanzenphysiologisches Institut der Universität Göttingen" 37073 Göttingen, Germany].

Aquarium 2 is inoculated with algae strains directly isolated from the glass walls of an aquarium of fish culture.

The control aquarium derives from an aquarium with aquatic plants.

After incubation for 6 days the foils are put into the algae X-AAP medium described in Table 3 (2/3 of the foil in the water and 1/3 out of the water). The glass slides are placed on the bottom of the aquarium.

TABLE 3

Stock solution in deionized water of conductivity <5μ Siemens cm$^{-1}$

| Growth Medium | Substances | Concentration (g/liter) |
|---|---|---|
| Macro-nutrients | $NaHCO_3$ | 15 |
| | $K_2HPO_4, 3H_2O$ | 1.4 |
| | $MgSO_4, 7H_2O$ | 15 |
| | $NaNO_3$ | 26 |
| | $MgCl_2, 6H_2O$ | 12 |
| | $CaCl_2, 2H_2O$ | 4.4 |
| Micro-nutrients | $H_3BO_3$ | 0.19 |
| | $MnCl_2, 4H_2O$ | 0.42 |
| | $ZnCl_2$ | 0.0033 |
| | $CoCl_2, 6H_2O$ | 0.0014 |
| | $CuCl_2, 2H_2O$ | 0.000012 |
| | $Na_2MoO4, 2H_2O$ | 0.0073 |
| | $FeCl_3, 6H_2O$ | 0.16 |
| | $Na_2EDTA, 2H_2O$ | 0.3 |

The test conditions are following: water temperature 20° C.±2° C., light regime 16 hours light: 8 hours dark, light intensity 15000-20000 lux (Xenon plant lamps).

The algae growth is evaluated visually with the following scheme:

3 denotes for heavy growth 2 denotes for growth 1 denotes for slight growth, just visible 0 denotes for no growth The results for aquarium 1 is summarized in Table 4. The results of aquarium 2 is summarized in Table 5.

TABLE 4

Processing of polycarbonate according to Example 16

| Example | Additive | Assessment After 12 days | Assessment After 4 weeks |
|---|---|---|---|
| 17a[a)] | Glass slides | 1 | 3 |
| 17b[a)] | None | 2 | 2 |
| 17c[b)] | 5% Tinuvin 1577[c)] 3% Example 5 | 1 | 1 |
| 17d[b)] | 5% Tinuvin 1577[c)] 5% Example 5 | 1 | 1 |

Explanation of footnotes [a)], [b)] and [c)] see end of Table 5.

TABLE 5

Processing of polycarbonate according to Example 16

| Example | Additive | Assessment After 12 days | Assessment After 4 weeks |
|---|---|---|---|
| 17e[a)] | Glass slides | 1 | 2 |
| 17f[a)] | None | 2 | 3 |
| 17g[b)] | 5% Tinuvin 1577[c)] 3% Example 5 | 1 | 3 |

TABLE 5-continued

Processing of polycarbonate according to Example 16

| Example | Additive | Assessment After 12 days | Assessment After 4 weeks |
|---|---|---|---|
| 17h[b] | 5% Tinuvin 1577[c] 5% Example 5 | 0 | 1 |

[a]Comparison Example.
[b]Example according to the invention.
[c]Tinuvin 1577 (Ciba Specialty Chemicals Inc.) is a UV absorber of the formula UV-1

(UV-1)

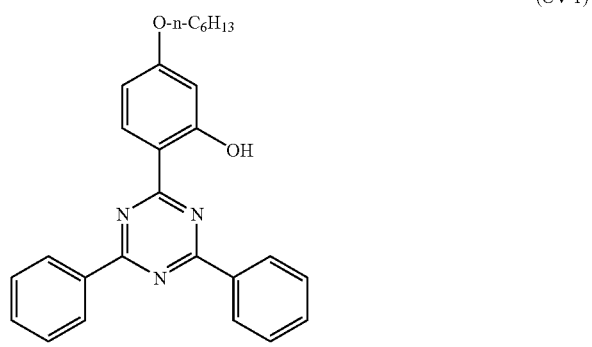

EXAMPLE 18

Processing of Extrusion Tapes Using the Oligo- and Poly-Carbonates Terminated with Silicon Containing Groups as Bulk Material In order to evaluate the surface properties of the new compounds of the formula I as bulk material or as additive, the following procedure is used:

Appropriate amounts of each compound of the formula I are dried in a vacuum oven for eight hours at 120° C. They are extruded in a twin-screw extruder (MiniLab extruder from Thermo Electron Corporation) equipped with a flat die. In this way, tapes are produced with a width of 5 mm and a thickness of around 0.5 mm. The processing temperature is around 280° C. All produced tapes have a transparent visual appearance.

The contact angle of the produced tapes are measured with a Dataphysics OCA 30 contact angle device, using the sessile drop method and water as measuring liquid. The results are summarized in Table 6.

TABLE 6

| Example | Composition | Contact angle (°) |
|---|---|---|
| 18a[a] | 100% Makrolon 3108 FBL from Bayer | 86 |
| 18b[a] | 95% Makrolon 3108 FBL from Bayer 5% Tinuvin 1577[c] | 86 |
| 18c[b] | 100% Example 5 | 105 |
| 18d[b] | 95% Example 5 5% Tinuvin 1577[c] | 103 |
| 18e[b] | 1% Example 13 | 97 |
| 18f[b] | 3% Example 13 | 96 |
| 18g[b] | 1% Example 14 | 99 |
| 18h[b] | 3% Example 14 | 102 |

Explanation of footnotes a), b) and c) see end of Table 5.

EXAMPLE 19

Processing of Polycarbonate Injection Molded Plaques Containing the Oligo- and Poly-Carbonates Terminated with Silicon Containing Groups as Surface Modifiers In order to evaluate their surface properties, oligo- and poly-carbonates terminated with silicon containing groups of the formula I are incorporated in polycarbonate injection molded plaques according to the following procedure:

A polycarbonate powder [Maroon 3108 FBL (RTM) from Bayer] is dried in a vacuum oven for eight hours at 120° C. Appropriate amounts of each compound of formula I is added to the dried polycarbonate powder to obtain formulations containing up to 10% by weight of the compound of the formula I. The formulations are mixed in a turbo mixer and compounded to pellets in a twin-screw extruder (MiniLab from Thermo Electron Corporation) and further injection molded to plaques of a width of 30 mm, length of 40 mm and thickness of 2 mm using a micro-injection molding machine (BabyPlast from CronoPlast). The processing temperature is around 280° C. All produced plaques have a transparent visual appearance.

The contact angles of the produced tapes are measured with a Dataphysics OCA 30 contact angle device, using the sessile drop method and water as measuring liquid. The results are summarized in Table 7.

TABLE 7

| Example | Additive | Contact angle (°) |
|---|---|---|
| 19a[a] | none | 79 |
| 19b[a] | 5% Example 5 | 91 |
| 19c[b] | 10% Example 5 | 94 |

Explanation of footnotes [a] and [b] see end of Table 5.

EXAMPLE 20

Processing of PET Injection Molded Plaques Containing the Oligo- and Poly-Carbonates Terminated with Silicon Containing Groups as Surface Modifiers In order to evaluate their processability in PET, oligo- and poly-carbonates terminated with silicon containing groups of the formula I are incorporated in polyester injection molded plaques according to the following procedure:

A polyester powder [Polyclear 1101 (Kosa) or Eastar 6763 (Eastman)] is dried in a vacuum oven for eight hours at 120° C. Appropriate amounts of each compound of formula I is added to the dried polyester powder to obtain formulations containing up to 10% by weight of the compound of the formula I. The formulations are mixed in a turbo mixer and compounded to pellets in a twin-screw extruder (MiniLab from Thermo Electron Corp.) and further injection molded to plaques of a width of 30 mm, length of 40 mm and thickness of 2 mm using an micro-injection molding machine (Baby-Plast from CronoPlast). The processing temperature is around 260° C. All produced plaques have a transparent visual appearance as summarized in Table 8.

TABLE 8

| Example | Additive | Aspect |
| --- | --- | --- |
| 20a[a)] | None | Transp. |
| 20b[b)] | 5% Example 5 | Transp. |
| 20c[b)] | 10% Example 5 | Transp. |

Explanation of footnotes [a)] and [b)] see end of Table 5.

EXAMPLE 21

Water Repellency Properties of the Oligo- and Poly-Carbonates Terminated with Silicon Containing Groups as Surface Modifiers in Polypropylene Preparation of samples: In order to determine the repellency properties of the compounds of the formula I, an industrial sample of polypropylene nonwoven, fabric weight: 40 g/m$^2$, is dipped into a 1% THF solution of the test compound, simultaneously applying ultrasonic energy for 0.5 minute. After that, the sample is dried overnight at room temperature.

Repellency properties: The treated nonwoven samples are evaluated in the water repellency test similar to INDA test method 80.8 (99). The wetting behavior of the nonwovens is tested with a series of water/isopropanol mixtures. The observation of the wetting behavior is rated from 0 (water wetting, no repellency) to 10 (optimum water repellency). The results are summarized in Table 9.

TABLE 9

| | Fabric without heat treat | |
| --- | --- | --- |
| Example | Additive | Water Repellency Rating |
| 21a[a)] | none | 2 |
| 21b[b)] | Example 5 | 7 |
| 21c[b)] | Example 12 | 5 |

Explanation of footnotes [a)] and [b)] see end of Table 5.

EXAMPLE 22

Surface Properties for Polycarbonate Extrusion Sheets Containing the Oligo- and Poly-Carbonates Terminated with Silicon Containing Groups as Surface Modifiers The surface properties were evaluated by measuring the contact angle of the polycarbonate sheets described in Example 16 with a Dataphysics OCA 30 contact angle device, using the sessile drop method and water as measuring liquid. The results are summarized in Table 10.

TABLE 10

| Example | Additive | Contact angle (°) |
| --- | --- | --- |
| 22a[a)] | None | 86 |
| 22b[a)] | 5% Tinuvin 1577[c)] | 86 |
| 22c[b)] | 5% Tinuvin 1577[c)] 3% Example 5 | 91 |
| 22d[b)] | 5% Tinuvin 1577[c)] 5% Example 5 | 104 |

Explanation of footnotes [a)], [b)] and [c)] see end of Table 5.

What is claimed is:

1. A composition comprising
(a) a synthetic polymer which is susceptible to oxidative, thermal or light-induced degradation and
(b) at least one compound of the formula I

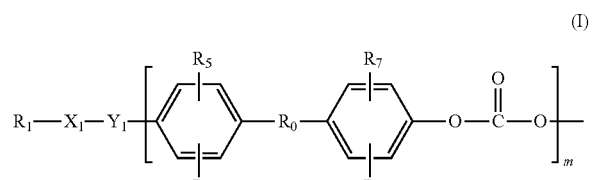
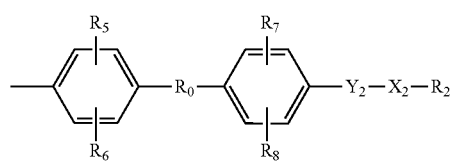

wherein

R$_0$ is a direct bond,

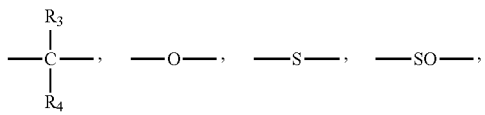

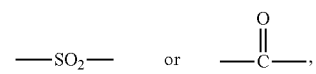

R$_1$ and R$_2$ are each independently of the other a silicon containing group,

R$_3$ and R$_4$ are each independently of the other hydrogen, a fluorine containing group, a silicon containing group, C$_1$-C$_{12}$ alkyl, phenyl or

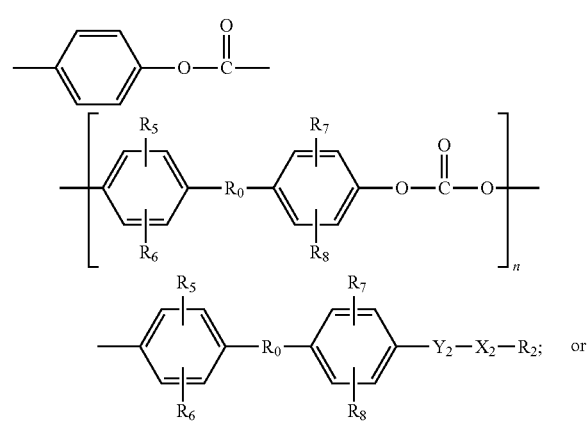

R$_3$ and R$_4$, together with the carbon atom to which they are bonded, form a C$_5$-C$_8$ cycloalkylidene ring that is unsubstituted or substituted by from 1 to 3 C$_1$-C$_4$ alkyl groups;

R$_5$, R$_6$, R$_7$ and R$_8$ are each independently of the other hydrogen, C$_1$-C$_{12}$ alkyl or C$_3$-C$_{12}$ alkenyl, X$_1$ and X$_2$ are each independently of the other C$_1$-C$_{12}$ alkylene or C$_4$-C$_{25}$ alkylene interrupted with oxygen;

Y$_1$ and Y$_2$ are each independently of the other a direct bond, oxygen,

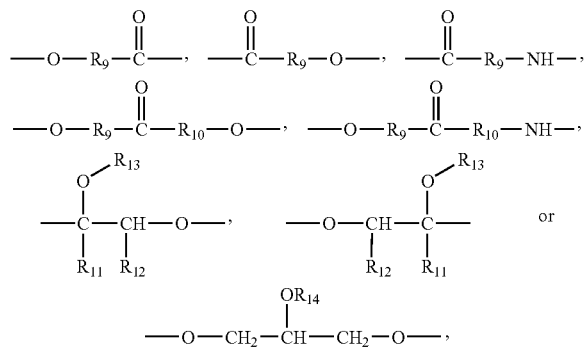

$R_9$ and $R_{10}$ are each independently of the other a direct bond or $C_1$-$C_4$ alkylene, $R_{11}$, $R_{12}$ and $R_{13}$ are each independently of the other hydrogen, $C_1$-$C_{12}$ alkyl or $C_3$-$C_{12}$ alkenyl, $R_{14}$ is hydrogen, $C_1$-$C_{12}$ alkyl or a silicon containing group,

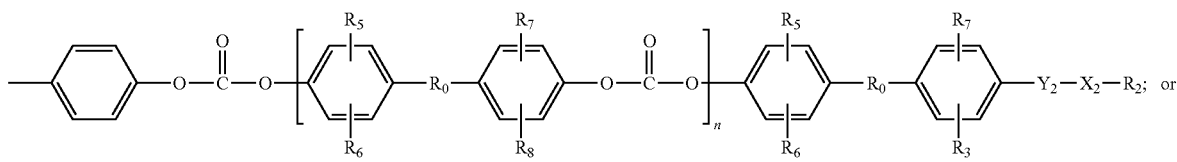

m is 0 to 10,000, and
n is 0 to 10,000 and
where the silicon containing group is of forula II

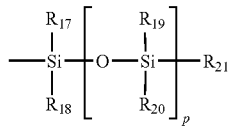

wherein
$R_{17}$, $R_{18}$, $R_{19}$ and $R_{20}$ are each independently of the other $C_1$-$C_{12}$ alkyl, $C_1$-$C_{12}$ alkyl substituted with hydroxy or amino; $C_4$-$C_{12}$ hydroxyalkyl interrupted with oxygen; or

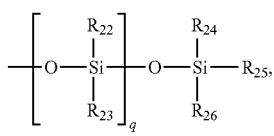

$R_{21}$ is $C_1$-$C_{12}$ alkyl or

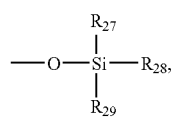

$R_{22}$, $R_{23}$, $R_{24}$, $R_{25}$, $R_{26}$, $R_{27}$, $R_{28}$ and $R_{29}$ are each independently of the other $C_1$-$C_{12}$ alkyl or $C_1$-$C_{12}$ alkyl substituted with hydroxy or amino;

p is 0 to 200 and
q is 0 to 200.

2. A composition according to claim 1, wherein the compounds of formula I
$R_0$ is

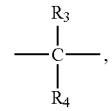

$R_1$ and $R_2$ are each independently of the other a silicon containing group, $R_3$ and $R_4$ are each independently of the other hydrogen, trifluoromethyl, a silicon containing group, $C_1$-$C_{12}$ alkyl, phenyl or

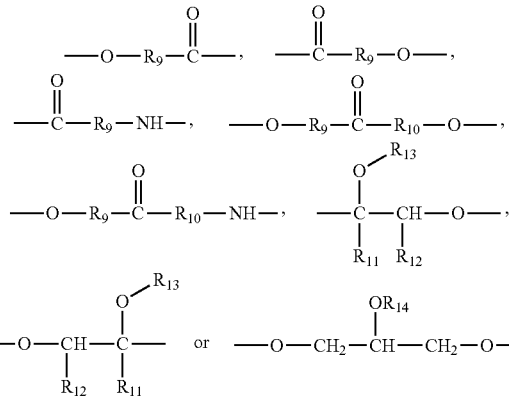

$R_3$ and $R_4$, together with the carbon atom to which they are bonded, form a $C_5$-$C_8$ cycloalkylidene ring that is unsubstituted or substituted by from 1 to 3 $C_1$-$C_4$ alkyl groups;

$R_5$, $R_6$, $R_7$ and $R_8$ are hydrogen, $X_1$ and $X_2$ are each independently of the other $C_1$-$C_{12}$ alkylene or $C_4$-$C_{25}$ alkylene interrupted with oxygen;

$Y_1$ and $Y_2$ are each independently of the other a direct bond, oxygen,

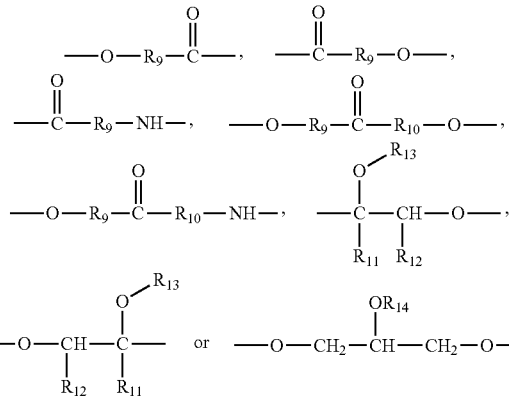

$R_9$ and $R_{10}$ are each independently of the other a direct bond or methylene, $R_{11}$, $R_{12}$ and $R_{13}$ are each independently of the other hydrogen, $C_1$-$C_4$ alkyl or $C_3$-$C_4$ alkenyl, $R_{14}$ is hydrogen or $C_1$-$C_{12}$ alkyl, m is 0 to 10,000 and n is 0 to 10,000.

3. A composition according to claim 1, wherein the compounds of formula I $R_{17}$, $R_{18}$, $R_{19}$ and $R_{20}$ are each independently of the other methyl or

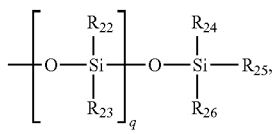

$R_{21}$ is methyl or

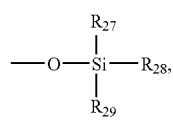

$R_{22}$, $R_{23}$, $R_{24}$, $R_{25}$, $R_{26}$, $R_{27}$, $R_{28}$ and $R_{29}$ are methyl and p and q are each independently of the other 0 to 100.

4. A composition according to claim 1, wherein the compounds of formula I $R_0$ is

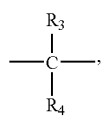

$R_3$ is hydrogen, $CF_3$, $C_1$-$C_{12}$ alkyl, phenyl or

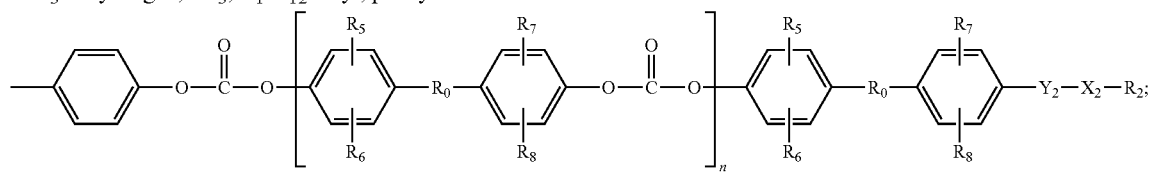

$R_4$ is hydrogen, $CF_3$, $C_1$-$C_{12}$ alkyl or phenyl; or $R_3$ and $R_4$, together with the carbon atom to which they are bonded, form a $C_5$-$C_8$ cycloalkylidene ring that is unsubstituted or substituted by from 1 to 3 $C_1$-$C_4$ alkyl groups;

$R_5$, $R_6$, $R_7$ and $R_8$ are hydrogen, $X_1$ and $X_2$ are each independently of the other $C_1$-$C_{12}$ alkylene or $C_4$-$C_{25}$ alkylene interrupted with oxygen;

$Y_1$ and $Y_2$ are each independently of the other a direct bond, oxygen,

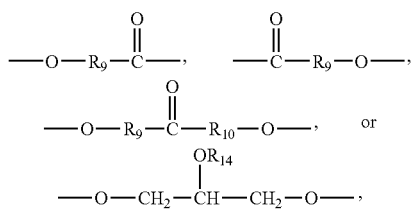

$R_9$ and $R_{10}$ are each independently of the other a direct bond or methylene, $R_{14}$ is hydrogen or $C_1$-$C_{12}$ alkyl, m is 0 to 10,000 and n is 0 to 10,000.

5. A composition according to claim 1, wherein the compounds of formula I $R_3$ and $R_4$ are each independently of the other hydrogen or $C_1$-$C_4$ alkyl; or $R_3$ and $R_4$, together with the carbon atom to which they are bonded, form a cyclohexylidene ring.

6. A composition according to claim 1, wherein the compounds of formula I $X_1$ and $X_2$ are each independently of the other $C_2$-$C_8$ alkylene or $C_4$-$C_{25}$ alkylene interrupted with oxygen.

7. A composition according to claim 1, wherein the compounds of formula I m is 0 to 100 and n is 0 to 100.

8. A composition according to claim 1, wherein the compounds of formula I $R_0$ is

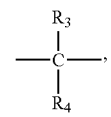

$R_3$ and $R_4$ are each independently of the other $C_1$-$C_4$ alkyl; or $R_3$ and $R_4$, together with the carbon atom to which they are bonded, form a cyclohexylidene ring;

$R_5$, $R_6$, $R_7$ and $R_8$ are hydrogen, $X_1$ and $X_2$ are each independently of the other $C_2$-$C_4$ alkylene or $C_4$-$C_{25}$ alkylene interrupted with oxygen;

$Y_1$ and $Y_2$ are each independently of the other a direct bond, oxygen,

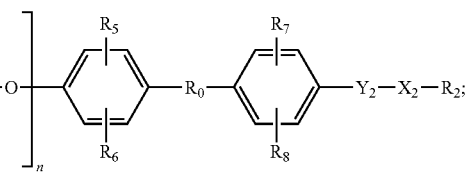

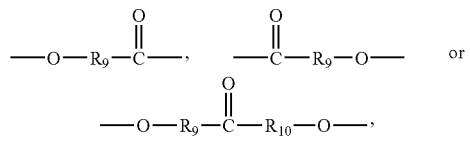

$R_9$ and $R_{10}$ are each independently of the other a direct bond or methylene, m is 0 to 100 and n is 0 to 100.

9. A composition according to claim 1 further comprising (β) one or more additives selected from the group consisting of phenolic antioxidants, light-stabilizers, processing stabilizers, nucleating agent, biocides, antistatic agents, flame retardants and fillers.

10. A composition according to claim 9, wherein the weight ratio of the components (b):(β) is from 100:0.01 to 0.01:100.

11. A composition according to claim 1 wherein component (a) is a polycarbonate, polyester, polyacrylate or polymethacrylate or their mixtures, blends or alloys.

12. A composition according to claim 1 wherein component (b) is present in an amount of from 0.1 to 20%, based on the weight of component (a).

13. A composition according to claim 1, comprising in addition, besides components (a) and (b), further additives.

14. A composition according to claim 13, comprising as further additives phenolic antioxidants, light-stabilizers and/or processing stabilizers.

15. A process for reducing the surface energy of synthetic polymers which process comprises incorporating therein or applying thereto a compound of the formula I

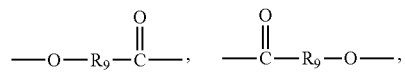

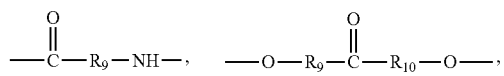

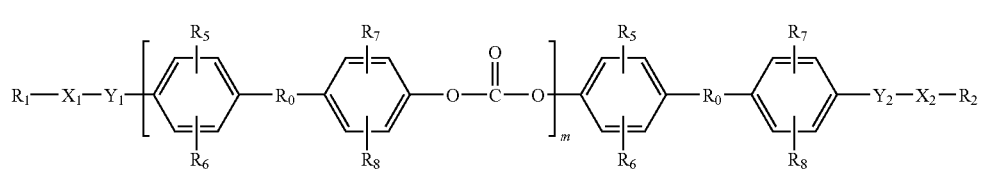

wherein $R_0$ is a direct bond

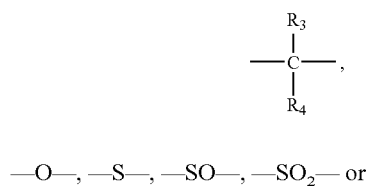

—O—, —S—, —SO—, —SO$_2$— or

$R_1$ and $R_2$ are each independently of the other a silicon containing group, $R_3$ and $R_4$ are each independently of the other hydrogen a fluorine containing group a silicon containing group, $C_1$-$C_{12}$ alkyl, phenyl or -continued

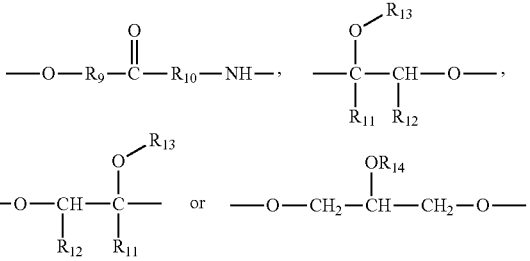

$R_9$ and $R_{10}$ are each independently of the other a direct bond or $C_1$-$C_4$ alkylene, $R_{11}$, $R_{12}$ and $R_{13}$ are each independently of the other hydrogen, $C_1$-$C_{12}$ alkyl or $C_3$-$C_{12}$ alkenyl, $R_{14}$ is hydrogen, $C_1$-$C_{12}$ alkyl or a silicon containing group, m is 0 to 10,000, and n is 0 to 10,000 and where the silicon containing group is of formula II

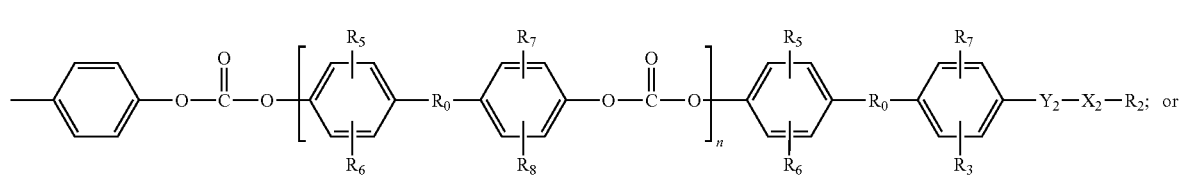

$R_3$ and $R_4$ together with the carbon atom to which the are bonded form a $C_5$-$C_8$ cycloalkylidene ring that is unsubstituted or substituted by from 1 to 3 $C_1$-$C_4$ alkyl groups;

$R_5$ $R_6$ $R_7$ and $R_8$ are each independently of the other hydrogen, $C_1$-$C_{12}$ alkyl or $C_3$-$C_{12}$ alkenyl, $X_1$ and $X$ are each independently of the other $C_1$-$C_{12}$ alkylene or $C_4$-$C_{25}$ alkylene interrupted with oxygen;

$Y_1$ and $Y_2$ are each independently of the other a direct bond, oxygen,

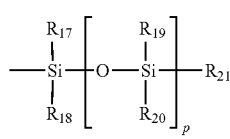

wherein
R$_{17}$, R$_{18}$, R$_{19}$ and R$_{20}$ are each independently of the other C$_1$-C$_{12}$ alkyl, C$_1$-C$_{12}$ alkyl substituted with hydroxy or amino; C$_4$-C$_{12}$ hydroxyalkyl interrupted with oxygen; or
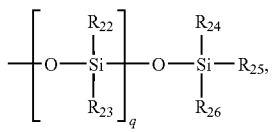
R$_{21}$ is C$_1$-C$_{12}$ alkyl or
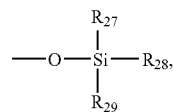
R$_{22}$, R$_{23}$, R$_{24}$, R$_{25}$, R$_{26}$, R$_{27}$, R$_{28}$ and R$_{29}$ are each independently of the other C$_1$-C$_{12}$ alkyl or C$_1$-C$_{12}$ alkyl substituted with hydroxy or amino;
p is 0 to 200 and
q is 0 to 200.
* * * * *